US012118338B1

(12) United States Patent
Benamu et al.

(10) Patent No.: US 12,118,338 B1
(45) Date of Patent: Oct. 15, 2024

(54) FACILITATING UPDATES TO DATA PIPELINES USING MODULARLY-GENERATED PLATFORM-AGNOSTIC DATA PIPELINE PORTIONS SYSTEMS AND METHODS

(71) Applicant: Citibank, N.A., New York, NY (US)

(72) Inventors: David Benamu, Tel Aviv (IL); Hila Gardi, Tel Aviv (IL); Mor Gelberg, Tel Aviv (IL); Hadar Karby, Tel Aviv (IL); Vaibhav Kumar, Jersey City, NJ (US); Ashutosh Pandey, Tampa, FL (US); Miriam Silver, Tel Aviv (IL)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/641,166

(22) Filed: Apr. 19, 2024

Related U.S. Application Data

(63) Continuation-in-part of application No. 18/497,854, filed on Oct. 30, 2023, which is a continuation of application No. 18/359,843, filed on Jul. 26, 2023, now Pat. No. 11,816,460, which is a continuation of application No. 18/124,543, filed on Mar. 21, 2023, now Pat. No. 11,733,984.

(51) Int. Cl.
*G06F 8/41* (2018.01)
*G06F 21/57* (2013.01)

(52) U.S. Cl.
CPC .......... *G06F 8/4452* (2013.01); *G06F 21/577* (2013.01)

(58) Field of Classification Search
CPC ....... G06F 8/4452; G06F 21/577; G06F 21/57
See application file for complete search history.

(56) References Cited

U.S. PATENT DOCUMENTS

| 10,747,506 B2 | 8/2020 | Seif et al. |
| 11,188,525 B2 | 11/2021 | Athavale et al. |
| 11,226,813 B2 | 1/2022 | Gungabeesoon et al. |

(Continued)

OTHER PUBLICATIONS

U.S. Appl. No. 18/535,001, filed Dec. 11, 2023, titled "Systems and Methods for Updating Rule Engines During Software Development Using Generated Proxy Models With Predefined Model Deployment Criteria".

*Primary Examiner* — Marina Lee
(74) *Attorney, Agent, or Firm* — Perkins Coie LP

(57) ABSTRACT

Systems and methods for facilitating updates to data pipelines using modularly-generated platform-agnostic data pipeline portions are disclosed. The system receives a user selection of a portion of a data pipeline comprising (i) a set of nodes each indicating a data pipeline component and (ii) a set of links linking the set of nodes. The system then generates a modular-portion of the data pipeline architecture, via a transformation component, based on the user selection and stores the modular-portion of the data pipeline architecture in a remote database. The system then receives an update to at least one node of the set of nodes of the modular-portion of the data pipeline architecture. The system then updates at least a subset of a set of pre-existing data pipelines that use the generated modular-portion of the data pipeline to incorporate the update to the at least one node of the set of nodes.

20 Claims, 12 Drawing Sheets

(56) References Cited

U.S. PATENT DOCUMENTS

| | | |
|---|---|---|
| 11,614,923 B2 * | 3/2023 | Burnett ................. G06F 16/252 |
| | | 717/109 |
| 11,733,984 B1 | 8/2023 | Kumar et al. |
| 11,734,027 B2 | 8/2023 | Katahanas et al. |
| 11,983,636 B2 | 5/2024 | Kujawinski et al. |
| 2018/0052861 A1 | 2/2018 | Seetharaman et al. |
| 2018/0342324 A1 | 11/2018 | Cha et al. |
| 2019/0384461 A1 * | 12/2019 | Seif ....................... G06F 3/0484 |
| 2020/0242487 A1 | 7/2020 | Jain et al. |
| 2021/0034581 A1 | 2/2021 | Boven et al. |
| 2021/0064742 A1 | 3/2021 | Panigrahi |
| 2021/0304021 A1 | 9/2021 | Puri et al. |
| 2022/0121981 A1 | 4/2022 | Chaudhuri et al. |
| 2022/0245115 A1 | 8/2022 | Kulkarni et al. |
| 2022/0398186 A1 | 12/2022 | Mudumba |

\* cited by examiner

FACILITATING UPDATES TO DATA PIPELINES USING MODULARLY-GENERATED PLATFORM-AGNOSTIC DATA PIPELINE PORTIONS SYSTEMS AND METHODS

CROSS-REFERENCE TO RELATED APPLICATION(S)

This application is a continuation-in-part of U.S. patent application Ser. No. 18/497,854 entitled "GENERATING A PLATFORM-AGNOSTIC DATA PIPELINE VIA A LOW CODE TRANSFORMATION LAYER SYSTEMS AND METHODS" filed Oct. 30, 2023, which is a continuation of U.S. patent application Ser. No. 18/359,843 (now U.S. Pat. No. 11,816,460) entitled "GENERATING A PLATFORM-AGNOSTIC DATA PIPELINE VIA A LOW CODE TRANSFORMATION LAYER SYSTEMS AND METHODS" filed Jul. 26, 2023 which is a continuation of U.S. patent application Ser. No. 18/124,543 (now U.S. Pat. No. 11,733,984) entitled "GENERATING A PLATFORM-AGNOSTIC DATA PIPELINE VIA A LOW CODE TRANSFORMATION LAYER SYSTEMS AND METHODS" filed Mar. 21, 2023. The content of the foregoing applications are incorporated herein by reference in its entirety.

BACKGROUND

Creating robust and useful data pipelines is often a task spearheaded by computer scientists and data analysts due to the sheer complexity and knowledge required to create data pipelines. For instance, a data pipeline may represent a chain of data processing elements that can transform and move raw data from one or more sources to a destination. For example, when creating a data pipeline, a user must understand the intricacies involved with the type of data, how to filter the data, how to combine data of differing sources, and ultimately how to export the data in an easily understood format. Moreover, creating a data pipeline takes an exorbitant amount of time which may lead to useful data currently being provided by data sources to be missed or unconsidered when creating the data pipeline. Furthermore, end-users (e.g., business professionals or other non-specialized/non-technical users) have no knowledge/mechanism for creating data pipelines due to the complexity involved with creating data pipelines. Such users may understand the need for a given data set but are otherwise unable to obtain the desired data in a usable format due to lack of knowledge of how to create or set up a data pipeline required for obtaining the data set. Moreover, data pipelines may be configured for a given platform only (e.g., computing system, operating system, processor, etc.) and may not be scalable to other platforms, further increasing the difficulty when creating/using a data pipeline.

Figure 1:
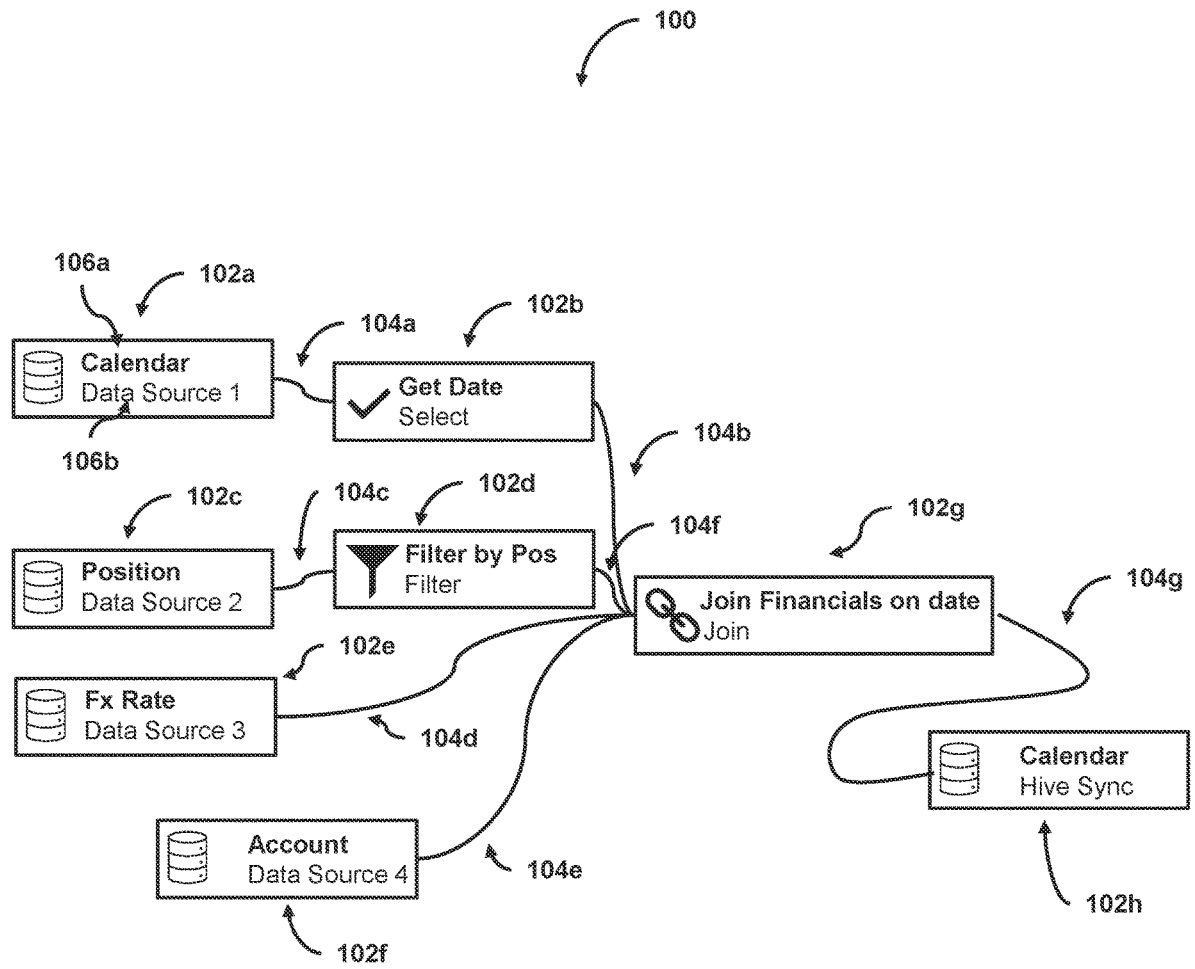
FIG. 1 is an illustrative platform-agnostic data pipeline via a low code transformation layer, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Given the complexity and specialized knowledge required for creating robust data pipelines, end-users are at a loss when attempting to obtain the necessary data required to analyze a given trend. For instance, business professionals are not trained nor do they possess the specialized knowledge to create a data pipeline from scratch, although the business professionals may know exactly the type of data they need to analyze. Existing solutions currently require that a business professional (e.g., an analyst) speak to a translator who may develop a strategic plan on which data sources are to be used and how one may alter the data (e.g., by filtering, combining, syncing, fitting, or otherwise operate on the data) to provide an easily understood format of the data to be used for analysis purposes. However, this still does not solve the problem of creating the data pipeline as the translator must communicate the plan with a computer/data engineer to physically create, design, and interconnect the computing architectures required to deliver the data in the requested format. This leads to an increased amount of wasted time, money, and disconnect as the amount of people required to implement the data pipeline is increased. In addition, the resulting data pipeline does not adequately conform to the original requirements outlined by the business professional, leading to additional effort and resource usage to correct the issues.

Another common issue faced when creating data pipelines is determining which platform is best suited for the data pipeline. For instance, as conventional software applications (e.g., a data pipeline, legacy software, etc.) are specific to a particular platform due to the compilers used to compile the source code associated with the data pipeline, the computer/data engineers must carefully select which computing language to write the source code in and which platform the pipeline will execute on. This leads to scalability issues as one pipeline does not execute properly (if at all) on a different platform as the new processor may be of a different architecture (e.g., instruction set) that is incompatible with a generated executable file of the original pipeline. Although computer engineers can recompile the source code on a different compiler, such executable files are not easily shared. For example, when a large amount of users are using the pipeline on a given platform, when the platform changes, the computer engineers must recompile the original source code, distribute the generated executable file associated with the recompiled source code (e.g., over the Internet or other computing networks), and finally reinstall the updated executable file. This leads to an increased amount of wasted computer processing resources, computer memory resources, and an increased amount of network traffic that otherwise may be used for other functions/operations.

Existing systems currently are designed for computer savvy computer/data engineers (e.g., users trained/skilled at generating software code) to create data pipelines that are specific to a given platform. However, without a mechanism to enable non-computer savvy users to create data pipelines, such users are at a loss for creating or implementing valuable data pipelines to obtain and analyze crucial data. Moreover, as the computer engineers may not fully understand one or more requirements an analyst needs to analyze the data appropriately, creating the data pipeline may be prone to numerous errors causing the computer engineers to go back, edit, and modify the data pipeline to fit the analysts' needs—thereby increasing the time at which these data pipelines are created while wasting valuable computing processing and memory resources at the same time. Lastly, as these existing systems create data pipelines custom tailored to a specific platform, users of other platforms cannot access the data pipeline or receive updates without waiting for a newly created executable file of the data pipeline to be implemented, further causing user frustration and increasing the amount of network traffic when updates or the executable file is shared.

An additional common problem faced when creating data pipelines is efficiently creating and updating data pipelines. For example, although a data pipeline in its entirety may be used for a specific purpose, often times components of one data pipeline (e.g., operations that the data pipelines perform) could be used with other data pipelines. However, there is currently no mechanism in place for detecting where reused elements are located (e.g., via disparate systems), or how to update existing pipelines using those could-be reusable components. Therefore, computer scientists are required to update data pipelines individually, thereby wasting the computer scientists' time and/or valuable computational resources (e.g., computer memory and processing power) that could otherwise be used to execute the data pipeline.

Thus, in light of these and other problems with conventional solutions and systems, there is a need for providing a simplified user interface that can enable users, such as business professionals, to create data pipelines without needing specialized training to create the necessary data pipeline. There is further a need to enable quick generation of these data pipelines to reduce the amount of time spent creating, adjusting, and modifying a data pipeline. Moreover, there is a need to create platform-agnostic data pipelines to enable data pipelines to be implemented on a variety of differing platforms, to provide updates to such data pipelines in a scalable and efficient manner, and to quickly share an implemented pipeline amongst users of different platforms. Additionally, there is a need to create modular-portions of data pipelines that are (i) reusable among other data pipelines and (ii) updatable across the other data pipelines that reuse the modular-portions of the data pipelines.

The inventors have developed a system for generating a platform-agnostic data pipeline via a low code transformation layer. For instance, the inventors have developed a low code transformation layer that uses one or more of an improved graphical user interface (GUI), a template, and predetermined code portions to generate a platform-agnostic data pipeline. End-users, such as business professionals, can use the GUI to easily select one or more nodes representing data pipelines operations and connect the nodes via one or more links. Using the nodes and the links, the system generates a template in a first computing language in which the low code transformation layer can determine predetermined code portions that correspond to the one or more nodes and links to generate executable instructions in a second computing language corresponding to a remote execution platform (e.g., to which the data pipeline is to be executed, hosted, or ran on). By using the improved user interface, users without specialized knowledge on how to implement a data pipeline are enabled to quickly create and develop their own data pipelines that are customizable and tailored to their needs. Furthermore, by using the low code transformation layer, the created data pipeline is platform-agnostic, meaning, that the data pipeline can be executed on any given platform irrespective of specific computing hardware (e.g., processors) or other computing-platform-related infrastructure. By doing so, the system reduces the amount of computer processing and memory resources conventionally required to create, share, and provide updates to the data pipeline.

In various implementations, the methods and systems described herein can generate a platform-agnostic data pipeline via a low code transformation layer. For example, the system receives user selection of (i) nodes and (ii) a set of links linking the nodes via a graphical user interface (GUI). The user selections can indicate an architecture of a data pipeline. The system can generate, using the user selections, a JSON object (e.g., or other software object/file) associated with the user selections indicating the data pipeline architecture. In response to receiving a user selection to implement the data pipeline (e.g., to be hosted on a remote execution platform), the system can determine, using the JSON object, a set of code portions. Each code portion of the set of code portions can correspond to a respective combination of at least (i) a first and a second node of the user selections and (ii) a link linking the first and second nodes. The system generates executable instructions (or other computer readable instructions) associated with the data pipeline architecture by using a transformation component configured to process the set of code portions with respect to the remote execution platform using the JSON object. The system then provides the executable instructions to the remote execution platform to host the data pipeline.

The inventors have also developed a system for facilitating updates to data pipelines using modularly-generated platform-agnostic data pipeline portions. For example, the system can receive, via a GUI, a user selection of a portion of a data pipeline indicating (i) a set of nodes each indicating a data pipeline component and (ii) a set of links linking the set of nodes. For example, the user selection is via a drag and drop user selection of the set of nodes and links. The system may then generate a modular-portion of the data pipeline architecture, via a transformation component, based on the user selection. For example, by leveraging a user selection of the set of nodes and links, and then generating a modular-portion of the data pipeline architecture, the system provides not only an improved user experience, but may enable non-technically savvy users to save these modular-portions for future use, enabling re-usability among data pipeline portions. In this way, the system reduces the amount of wasted computational resources traditionally utilized when generating specific data pipelines (e.g., as modular-portions can be generated, stored, and reused upon command).

In some implementations, the modular-portions of the data-pipeline architecture can be modified, updated, or configured across various data pipelines. To illustrate, the system can receive an update to at least one node of the set of nodes indicating a first data pipeline component of the modular-portion of the data pipeline architecture. For example, while reusing modularly-generated portions of data pipeline architectures (e.g., data pipelines) is useful when creating data pipelines, existing systems do not have a mechanism to maintain these pipelines. For instance, when an update to a data pipeline is required, computer scientists are required to manually update each data pipeline. This leads to data pipeline downtime and causes data scientists to waste valuable computational resources attempting to identify each data pipeline that requires an update.

To overcome data pipeline downtime and efficiently update data pipelines across disparate system, the system detects the update, and updates at least a subset of a set of pre-existing data pipelines that use the generated modular-portion of the data pipeline to incorporate the update to the at least one node of the set of nodes indicating the first data pipeline component. The system can determine each pre-existing data pipeline that uses the generated modular-portion of the data pipeline. Upon determining each pre-existing data pipeline that uses the generated modular-portion, the system can push, or otherwise update at least a subset of the determined pre-existing data pipelines to incorporate the newly received update. In this way, the system reduces update times to date pipelines as updates to a modular-portion are automatically pushed to each data pipeline that use the modular-portion—thereby reducing wasted computational resources and enhancing the user experience (e.g., as maintenance efforts are reduced).

In various implementations, the methods and systems described herein can facilitate updates to data pipelines using modularly-generated data pipeline portions. For example, the system can receive, via a GUI, a user selection of a portion of a data pipeline comprising (i) a set of nodes each indicating a data pipeline component and (ii) a set of links linking the set of nodes. The system can generate a modular-portion of an architecture for a data pipeline, via a transformation component, based on the user selection. The system can store the modular-portion of the data pipeline architecture in a remote data base. The system can receive an update to at least one node of the set of nodes indicating a first data pipeline component of the modular-portion of the data pipeline architecture. The system can then update at least a subset of a set of pre-existing data pipelines that use the generated modular-portion of the data pipeline to incorporate the update to the at least one node of the set of nodes indicating the first data pipeline component.

In the following description, for the purposes of explanation, numerous specific details are set forth in order to provide a thorough understanding of implantations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 shows an illustrative platform-agnostic data pipeline via a low code transformation layer, in accordance with some implementations of the present technology. For example, a user (e.g., an analyst, a computer engineer, a data engineer, a corporate executive, or other user) can create a platform-agnostic data pipeline 100. For example, the platform-agnostic data pipeline may include nodes 102a-102h (or as collectively referred to as nodes 102) and links 104a-104g (or as collectively referred to links 104). Each node 102 can be associated with a data source or an operation. As an example, a data source can be any database, table, data structure, or other data source configured to store data. As another example, an operation can be any operation that performs an action (e.g., on data, associated with data, or with respect to data). For instance, an operation may be a filter operation, a transform operation, a join operation, a select operation, a remove operation, a group operation, a load to database operation, drop column operation, drop row operation, add column operation, add row operation, sort operation, format operation, or other operation that may be performed on or performed with data.

Each node or operation can include or be provided with one or more user selectable commands or user provided instructions. For example, a filter operation may filter data by a position or other criteria (e.g., as inputted by the user). In some implementations, the user selectable commands or user provided instructions may be default commands or instructions (e.g., not requiring a user to select or provide instructions). For example, a join operation may be associated with default commands to append rows from one data source to another data source. Alternatively, the join operation may be associated with user selectable commands (e.g., indicating to join only certain rows/columns of one data source with certain rows/columns of another data source). Such user provided commands/instructions may be provided by the user (e.g., selecting one or more commands/instructions from a list, drop down menu, or other interface, providing one or more commands/instructions by typing in the commands/instructions, performing one or more gestures, or otherwise providing the commands/instructions). In some implementations, the commands or instructions may further indicate a set of criteria, as will be described below.

Nodes or operations of the platform-agnostic data pipeline can perform generic operations (e.g., computer operations) and/or specific operations for particular applications. For example, an operation of the platform-agnostic data pipeline can include a filter operation that can filter data according to a date, time, position, value, a format, a length, a size, or other value associated with the data. A transform operation of the data pipeline can transform data into a given format, metric, size, measurement, currency, range, or other transformation criteria associated with the data. A join (e.g., link) operation can join data of a set of data sources together, such as joining rows/columns of a data source(s), appending data to a data structure, or other joining operation with respect to a set of data sources. A select (e.g., fetch) operation can select, obtain, get, or retrieve data with respect to a given criteria (e.g., select data based on a date, select data based on a format, select data based on a type, etc.). A remove operation may remove data from a given data source/data structure, such as removing rows/columns, removing values, removing headers, removing nodes of a tree data structure, removing links of a tree data structure, or other data removing operation. A group operation may group data together, such as grouping data based on a type, size, range, date, time, value, or other data grouping criteria. A load to database operation may upload data to a given data source, database, data structure, update a database/data structure, or other database loading operation. A drop column operation may remove, hide, or delete a given column (e.g., in a table data structure). A drop row operation may remove, hide, or delete a given row (e.g., in a table data structure). An add column operation may add, append, update, or join a column (e.g., in a table data structure). An add row operation may add, append, update, or join a row (e.g., in a table data structure). A sort operation may sort information based on a time, date, value, size, metric, or other data sorting criteria. A format operation may format data of a data source/data structure such as formatting data to a particular size, value, length, date, time, or other data formatting criteria. A conversion (e.g., mapping) operation may convert (e.g., map) data from one format to another format, such as converting data from one currency to another currency, one converting data from one metric to another metric, or other conversion criteria. A group operation can group together data of a dataset (e.g., according to particular criteria or attributes of the associated data). A calculation operation can perform calculations, arithmetic operations, matrix operations, data analytics, data processing, or other suitable data processing tasks.

As shown in FIG. 1, each node can be labeled with a set of labels. For example, first node 102*a* may include first label 106*a* and second label 106*b*. Each label can indicate a reference value and a type value. For example, first label 106*a* indicates a reference value of "Calendar" indicating that the data source is a calendar data source, and second label 106*b* indicates a type value indicating that the node is associated with a "Data Source" (or data base type). In this way, when creating a data pipeline, users are provided with clear labels indicating an identifier associated with the node (e.g., a label associated with a given operation or data source to which data is modified, changed, altered, or obtained from) and a type identifier indicating what type of node is selected (e.g., a data source node, an operation node, or other node), thereby improving the user experience via an improved user interface.

The platform-agnostic data pipeline 100 can also include links 104. For example, the links may link together a set of nodes. For instance, first link 104*a* links first node 102*a* and second node 102*b*. In some implementations, each link 104 may be a directional link (e.g., indicating a data flow between one or more nodes).

Linking a set of nodes together may be associated with "connecting" or "supplementing" data associated with one node to data associated with another node (or an operation to another operation, or other combination). For example, to provide users with an easy-to-use user interface when creating data pipelines, as opposed to existing systems that require computer engineers and data engineers to manually code each interaction between a data source and an operation, users may quickly and easily link nodes together to forego the complex knowledge and specialized skills required to write code to implement a data pipeline architecture.

Links 104 can represent a path connecting two nodes together. For instance, as nodes may be associated with a data source, an operation, or an output (e.g., a visualization of data, a data structure, formatted data, etc.), when a node is linked to another node, data may be passed between the node(s). As an example, first node 102*a* may be linked via first link 104*a* to second node 102*b*. Where first node 102*a* represents a data source (e.g., a database) and second node 102*b* represents an operation node (e.g., select operation). As first node 102*a* and second node 102*b* are linked together, and second node 102*b* is an operation node (e.g., select operation node), second node 102*b* may retrieve data that may be associated with first node 102*a*. That is, in this example, first node 102*a* may be associated with a data source including dates and second node 102*b* may be configured to retrieve the dates associated with first node 102*a* via first link 104*a*. It should be noted that other combinations of nodes linked together may exist, in accordance with some implementations of the present technology. As such, links 104 may operationally connect nodes together to quickly and easily generate a flow of data between one or more nodes. In this way, the system may generate data pipelines without requiring users to be proficient in data pipeline architecture creation, thereby improving the user experience.

Suitable Computing Environments

Figure 2:
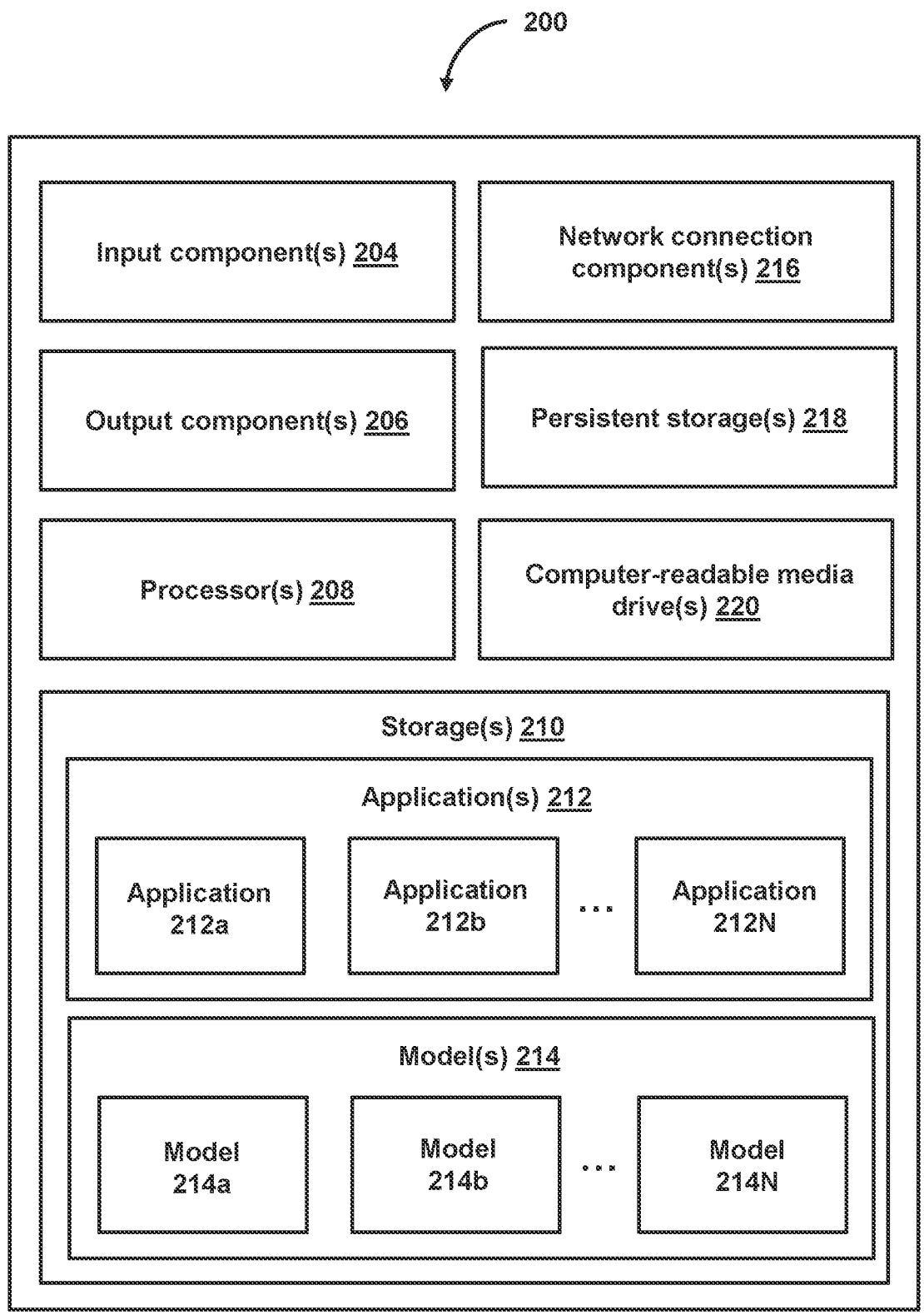
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
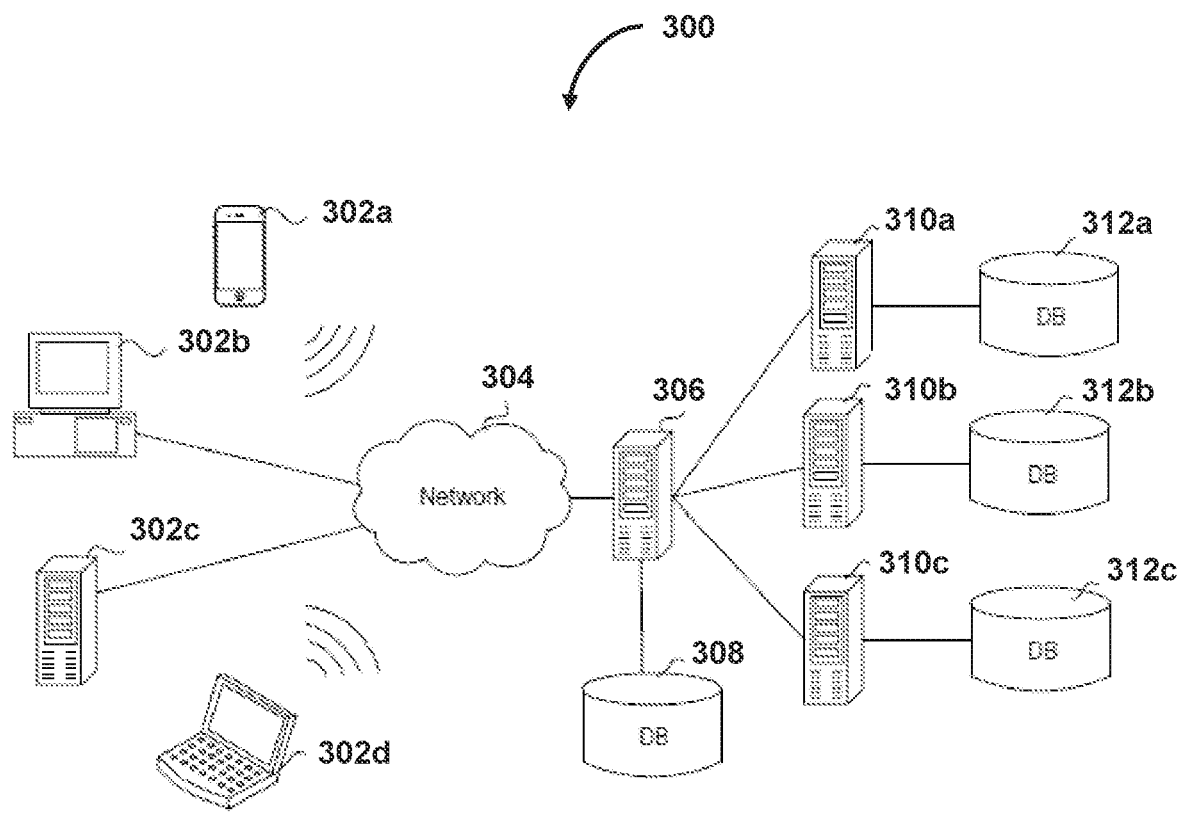
FIG. 3 is a system diagram illustrating an example of a computing environment in which the disclosed system operates in some implementations of the present technology.

FIG. 3 is a system diagram illustrating an example of a computing environment in which the disclosed system operates in some implementations. In some implementations, environment 300 includes one or more client computing devices 302a-d, examples of which can host the platform-agnostic data pipeline 100 (or other system components). For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server computing device 310 can correspond to a group of servers, and each of these servers can share a database or can have its own database. Databases 308 and 312 warehouse (e.g., store) information such as, predefined ranges, predefined thresholds, error thresholds, graphical representations, code portions (e.g., predetermined code portions, predetermined code portions corresponding to combinations of nodes and links, policy-controlled code portions), system policies or other policies, templates, JSON templates, JSON objects, computing languages, platform identifiers, data structures, software application identifiers, nodes, links, graphical representations of nodes and links, predetermined data pipeline architectures, default data pipeline architectures, pre-generated data pipelines, data pipelines, transformation components, visual layouts, security-assessment values, computing language identifiers, mathematical formulas (e.g., weighted average, weighted sum, or other mathematical formulas), graphical elements (e.g., colors, shapes, text, images, multimedia), system protection mechanisms, user sections of modular portions of data pipeline architectures, modular-portions of data pipeline architectures, platform-agnostic modular-portions of data pipeline architectures, machine learning models, artificial intelligence model, training data for artificial/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Generating Platform-Agnostic Data Pipelines

Figure 4:
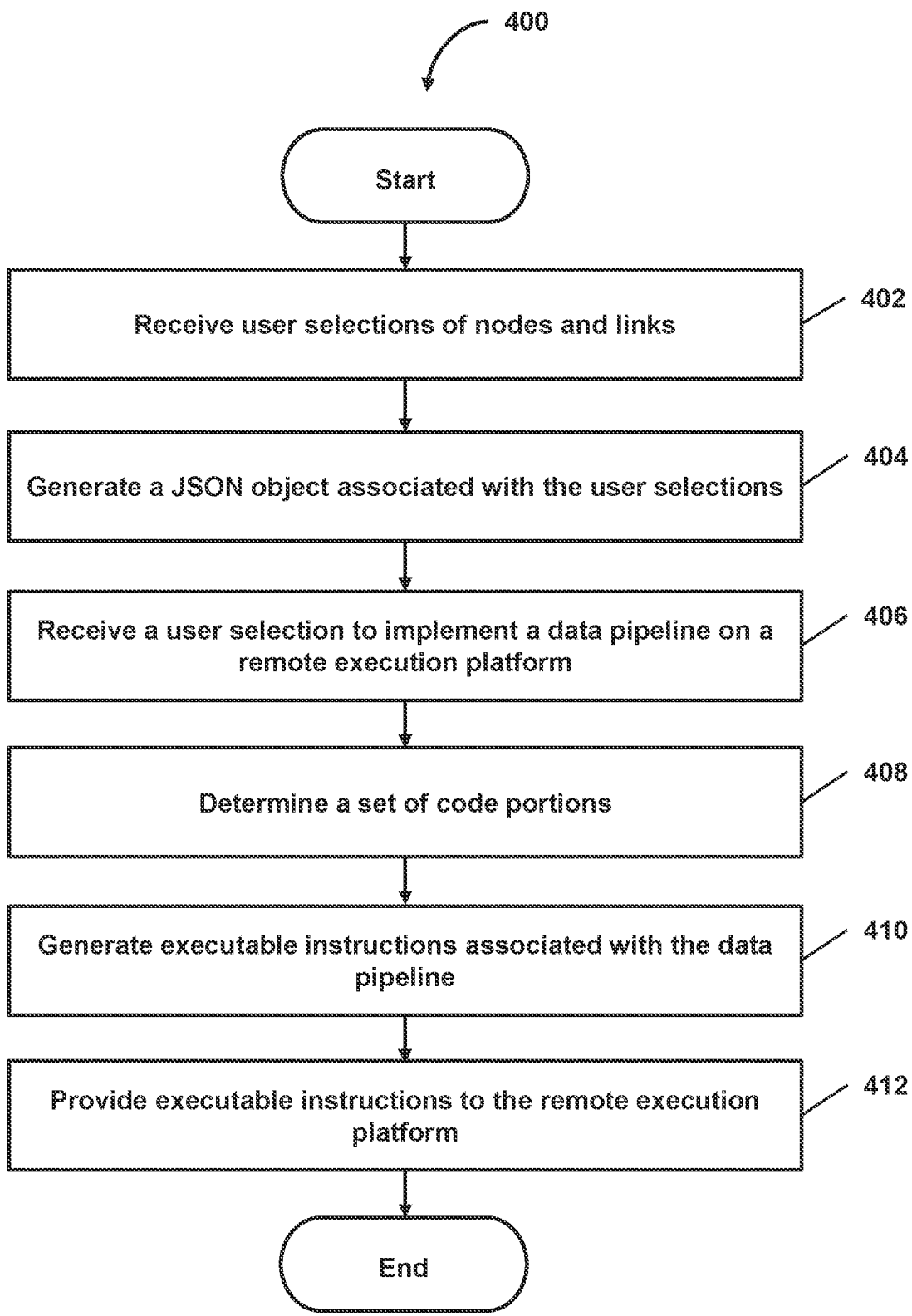
FIG. 4 is a flow diagram illustrating a process of generating a platform-agnostic data pipeline via a low code transformation layer, in accordance with some implementations of the present technology.

FIG. 4 a flow diagram illustrating a process of generating a platform-agnostic data pipeline via a low code transformation layer, in accordance with some implementations of the present technology.

At act 402, process 400 can receive user selections of nodes and links. For example, process 400 can receive, via a graphical user interface (GUI), user selections of (i) nodes and (ii) a set of links linking the nodes. For example, the user selections may indicate a data pipeline architecture of a data pipeline. To enable unskilled or otherwise untrained users to create data pipelines, a user may interact with a GUI to enable the user to select nodes, link nodes together, provide commands, instructions, or other criteria to generate a data pipeline without the need to possess the complex knowledge associated with coding a data pipeline from scratch via source code.

Figure 5:
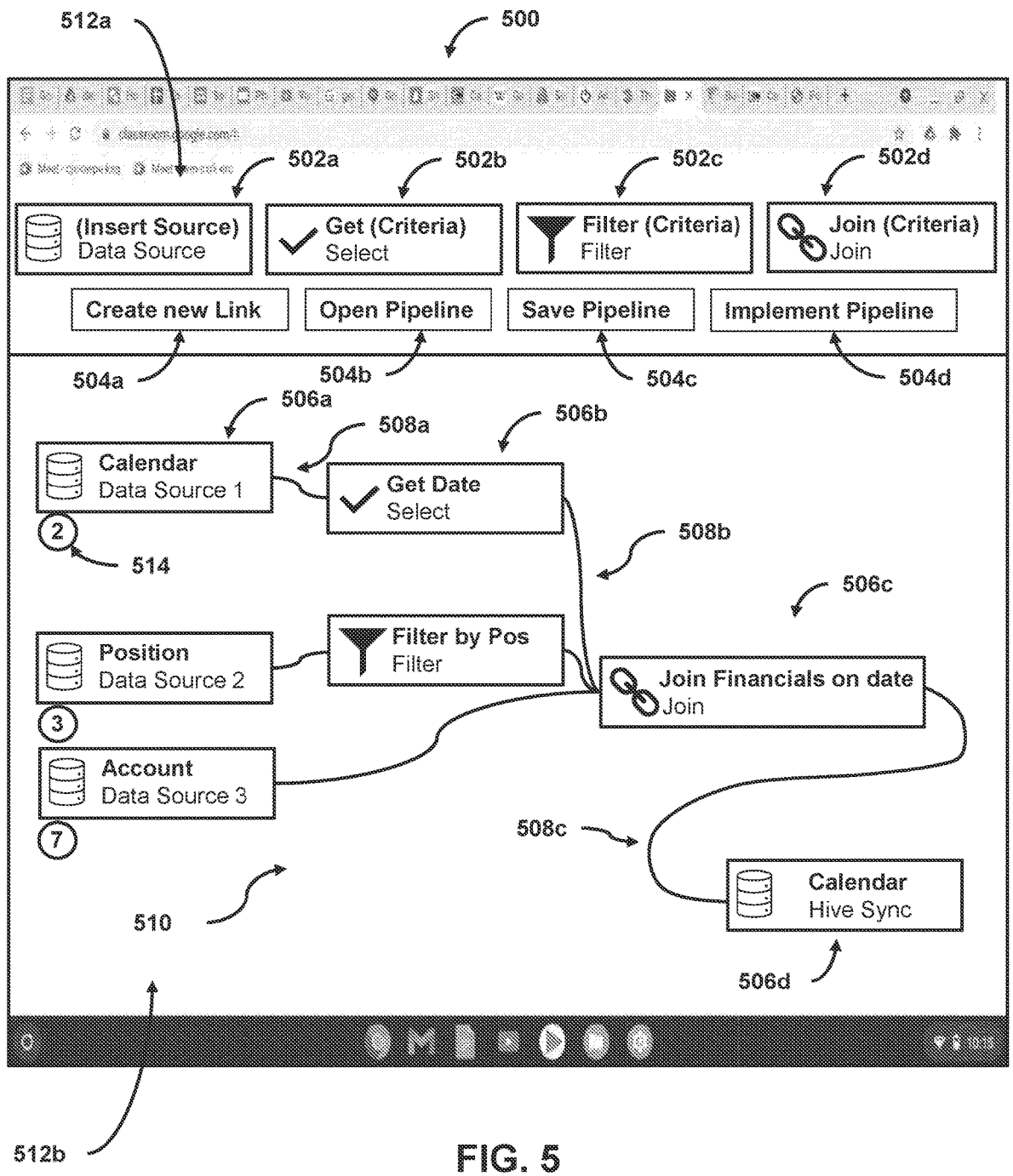
FIG. 5 shows an illustrative representation of a Graphical User Interface (GUI) for generating a platform-agnostic data pipeline via a low code transformation layer, in accordance with some implementations of the present technology.

Referring to FIG. 5, FIG. 5 shows an illustrative representation of a Graphical User Interface (GUI) for generating a platform-agnostic data pipeline via a low code transformation layer, in accordance with some implementations of the present technology. For example, GUI 500 can be provided via a website associated with a data pipeline service provider. The data pipeline service provider may enable users to create data pipelines via the GUI and in some implementations, when implemented, may generate executable instructions to host the data pipeline on one or more computing devices (e.g., a user device, a server, cloud-based computing network, or other computing device).

To enable users to create data pipelines, a user can interact with GUI 500. GUI 500 can include one or more user selectable components, such as node buttons 502a-502d (or as collectively referred to as node button(s) 502), command buttons 504a-504d (or as collectively referred to as command buttons 504), or other user selectable components. For example, in a first portion 512a of GUI 500, first portion 512a can display the user selectable components, and second portion 512b of GUI 500 can enable users to create a data pipeline architecture 510. For instance, first node button 502a may indicate a data source node (e.g., a data repository), second node button 502b may indicate a get operation node, third node button 502c may indicate a filter operation node, fourth node button 502d may indicate a join operation node. First command button 504a may indicate a new link button, second command button 504b may indicate a command to enable a user to open a pre-existing pipeline, third command button 504c may indicate a save pipeline button (e.g., to save the current data pipeline architecture 510 in second portion 512b of GUI 500), and fourth command button 504d may indicate an implement pipeline button (e.g., to run, host, or generate executable instructions to create the data pipeline architecture 510). It should be noted that the user selectable components shown in FIG. 5. are exemplarily and that other user selectable components (e.g., nodes, command buttons, etc.) may exist, in accordance with one or more implementations of the present technology.

In some implementations, a user may select the user selectable components to create (or otherwise generate a data pipeline). For example, a user may select user selectable components in a "drag-and-drop" fashion to create a data pipeline architecture. As another example, a user may select user selectable components and the selected user selectable component may be populated into the data pipeline architecture in one or more default positions (e.g., to enable the user to forgo dragging-and-dropping a user selectable component). By creating data pipelines via a GUI, the system generates for display, in a visual layout, the data pipeline architecture 510 of the created data pipeline to enable users to view the architecture of a data pipeline which reduces errors involved with creating data pipelines otherwise missed by conventionally coding data pipelines using source code. In this way, the system provides an easily understood GUI to enable unskilled users to create data pipeline architectures, thereby improving the user experience. Additionally, in this way, the system provides a GUI to enable users to edit or alter a data pipeline architecture without needing to compile or recompile each variation of the data pipeline, thereby reducing the amount of computer processing and computer memory resources otherwise required to edit a data pipeline.

In one use case, a user can create a data pipeline architecture 510 using user selectable components. The user may select one or more of node buttons 502 from first portion 512a of the GUI 500 and drag them into a position in a second portion 512b of the GUI 500. For instance, the user can select node button 502a and drag an instance of the node button 502a into the second portion 512b of the GUI 500 to place first node 506a. The user may then provide first node 506a with a label (e.g., Calendar) to indicate a data source (or database/data repository) from which data will be retrieved from. Similarly, the user can select node button 502b to drag an instance of the node button 502b into the second portion 512b of the GUI 500 to place second node 506b. The user may also provide second node 506b with an instruction (e.g., get date) to retrieve one or more dates from a given node. The user can also select command button 504a to create a new link. For example, the user may select command button 504a which may enable the user to draw, drag, drop, or otherwise create links 508. In this example, the user may draw a link connecting first node 506a and second node 506b together via first link 508a. As such, the user may repeat such actions to create a data pipeline architecture 510. For instance, the user may connect the nodes 506 via links 508 (e.g., including fourth node 506d, such as output node) to create the data pipeline architecture 510. In this way, the system enables unskilled users to efficiently and effectively create data pipelines through a GUI as opposed to writing source code, compiling, and testing the data pipeline, thereby improving the user experience.

In some implementations, a user selected node can include an instruction to generate a data structure. For example, to enable a user to analyze results associated with a data pipeline (e.g., retrieved data), the retrieved data may be stored in a data structure to be accessible to the user. As such, a user may select a node button that may be associated with an instruction/command to generate a data structure. For instance, upon selecting a node button, such as first node button 502a, and placing the selected node into position (e.g., fourth node 506d, such as a data output node), the user may provide fourth node 506d with an instruction/command to generate a data structure to store the retrieved data from the data pipeline architecture 510. In some implementations, the data structure can be a default data structure (e.g., a table, a tree, an array, etc.) or the data structure may be indicated (e.g., provided) by the user to enable the user to indicate which type of data structure (or format) they wish to output the data from the data pipeline architecture 510. Additionally, in some implementations, the user may further provide an instruction/command indicating a particular database to store the data retrieved by the data pipeline architecture 510. In this way, the system provides an easy-to-use user interface to enable users of varying knowledge backgrounds to create robust data pipelines, thereby improving the user experience.

At act 404, process 400 can generate a JSON object associated with the user selections. For example, process 400 can generate, using the user selections, a JSON object associated with the user selections indicating the data pipeline architecture. JSON (e.g., JavaScript Object Notation) is a format for storing and transporting data. The advantage of using JavaScript and generating a JSON object indicating the data pipeline architecture is to enable user-created data pipelines to be generated for any platform, regardless of the computing requirements of the given platform (e.g., the processors, instruction sets, hardware, software, etc.). For instance, a JSON object may be generated (e.g., via a website, webpage, web browser, or graphical user interface) to indicate the data pipeline architecture created by a user. As an example, the JSON object may indicate a template of the user selections (e.g., the nodes, the links linking the nodes, the user provided instructions/commands associated with the nodes, etc.) to enable a platform agnostic data pipeline to be generated.

As an example, upon creating a data pipeline via GUI 500 (FIG. 5), a user may select a command button 504 (e.g., third command button 504c) to save the data pipeline. Upon saving the data pipeline, process 400 may generate a JSON object of the data pipeline architecture 510 indicating a template of data pipeline architecture 510. For instance, the JSON object may include one or more key value pairs indicating nodes, instructions associated with the nodes, labels associated with the nodes, commands associated with the nodes, or other information of the data pipeline architecture. Additionally, the JSON object may further include information regarding the links of the data pipeline architecture 510, to indicate what nodes are connected together. As a JSON object uses a small amount of memory (e.g., 1 kb, 2 kb, 3 kb, etc.), the system reduces the amount of computing memory required to save/store data pipeline architectures as opposed to existing systems that require large source code files to implement/create data pipelines. Additionally, by using JSON objects indicating data pipeline architectures, data pipelines may be shared amongst users quickly and efficiently over wired/wireless computing networks (e.g., the Internet), thereby reducing the amount of network traffic and network bandwidth traditionally utilized to share fully implemented data pipelines.

At act 406, process 400 can receive a user selection to implement a data pipeline on a remote execution platform. For example, process 400 can receive a user selection to implement the data pipeline, where the data pipeline is to be hosted on a remote execution platform. For instance, a user may select a command button 504 (e.g., fourth command button 504*d*) to implement the data pipeline. The data pipeline may be implemented on a remote execution platform, such as a remote computing platform (e.g., remote server, remote computer, remote network, remote cloud computing system, etc.). For example, to reduce the amount of computer processing resources conventionally required to implement a data pipeline, a user can implement a data pipeline to be hosted on a remote server. The remote server may be part of a data pipeline service provider's computing network that may be configured to host data pipelines. Additionally, as a user may be creating a data pipeline architecture on a mobile device (e.g., smartphone), via a GUI (e.g., GUI 500), the user may indicate a remote execution platform to host (or otherwise implement/run) the data pipeline to reduce the amount of computational resources used at the mobile device. For instance, as a mobile device may not be configured with a robust processor or large memory, the user may implement the data pipeline on a remote execution platform. In some implementations, however, the data pipeline may be implemented on a non-remote execution platform (e.g., implemented locally on a device the user is currently using). For example, where the user is using a desktop computer, the data pipeline may be implemented on the desktop computer. In this way, the system enables various platforms to implement or host the data pipeline (e.g., where computer processor and memory resources may be sufficient or lacking), to allow a multitude of options to host the data pipeline, irrespective of computational requirements of a device the user is using the create the data pipeline architecture.

At act 408, process 400 can determine a set of code portions. For example, in response to receiving the user selection to implement the data pipeline, process 400 can determine, using the JSON object, a set of code portions. Each code portion of the set of code portions can correspond to a respective combination of at least (i) a first and a second node of the user selections and (ii) a link linking the first and second nodes. For instance, process 400 may detect a user selection to implement the data pipeline, and may cause, during a runtime routine, the identification of a platform identifier associated with the remote execution platform, the determination of the set of code portions (e.g., predetermined policy-controlled code portions), and the generation of executable instructions to implement the data pipeline. For example, by performing such steps during a runtime routine, the system may reduce the amount of computing processing and memory resources conventionally required to generate a data pipeline as runtime routines are performed at runtime (e.g., and do not require specialized compilers for a given computing language). That is, runtime routines do not rely on a compiler and may be generated quickly and efficiently as opposed to conventional computer programs requiring source code to be compiled and then executed on a specific platform, affecting the scalability and shareability of data pipelines (or other computer programs).

To generate a platform-agnostic data pipeline (e.g., to be hosted on a given platform), process 400 can identify which execution platform the data pipeline is to be hosted on. For instance, as each execution platform (e.g., computing device, computing system, server, servers, etc.) may each be associated with their own computational requirements (e.g., processors, software, hardware, memory requirements, security requirements, etc.), process 400 may identify which execution platform the data pipeline is to be executed on. By doing so, process 400 may determine the correct set of code portions to use when generating executable instructions for implementing the data pipeline.

As discussed above, the code portions can be predetermined policy-controlled code portions. For example, a service provider may use a policy for controlling which data repositories, sources, and actions (e.g., operations such as filtering, selecting, joining, etc.) on the data may be implemented. The policy may indicate security requirements or permissions that are associated with implementing the data pipeline. For example, as data pipelines can be used to obtain sensitive user data, the policy may provide requirements and other rules pertaining to use of the user data. As such, each code portion may be a pre-vetted code portion that conforms to one or more regulations, rules, or other policies as defined by the service provider and/or industry. Moreover, each code portion may be associated with a security assessment value indicating a level of security associated with the remote execution platform. For example, as described above, not only may the policy indicate security requirements associated with implementing the data pipeline, but the platform at which the data pipeline is to be executed on may also have its own security vulnerabilities. As such, when implementing a data pipeline, it is advantageous to be aware of how a code portion (e.g., the source code) for implementing a data pipeline may interact with a given platform. As such, each code portion may be associated with a predetermined security assessment value (e.g., score, value, quantitative value, qualitative value) indicating how secure the given code portion is with respect to a given execution platform. In some implementations, process 400 may generate for display the security assessment value, such as an indication of the potential security vulnerabilities associated with the code portion, via the GUI to notify the user of how secure the data pipeline to be implemented on the execution platform is. In this way, the user may be provided with security information to aid their decision as to implement the data pipeline on the given execution platform. Furthermore, in this way, the system may pre-vet access or other operations performed on data to reduce data breaches of sensitive user data, thereby improving the security of data obtained via data pipelines. Moreover, in this way, the system reduces the amount of computer processing and memory resources conventionally utilized during a manual review of ethical data harvesting by using the predetermined, vetted, policy-controlled code portions.

Additionally, each code portion of the set of code portions can correspond (or otherwise be associated with) a respective combination of a link of a set of links and nodes connected via the link. For instance, referring back to FIG. 5, as the JSON template (or JSON object) can indicate the architecture of the data pipeline, the JSON template may not include the actual code used to generate (or implement) the data pipeline. For example, as the JSON template may include node-related, link-related, or operation-related information of the data pipeline architecture, such as node identifiers, link identifiers, user selectable commands/instructions, data types, data labels, or other information, the JSON template may represent placeholder values for source code to be implemented. That is, to reduce the amount of computer memory conventionally utilized to edit, share, and implement data pipelines, the JSON template may be used as a template for which source code may be combined with to generate the data pipeline itself. For example, since the JSON template uses a minuscule amount of computer memory, the JSON template may be shared amongst other users (e.g., over one or more computing networks) while reducing the amount of bandwidth and network traffic conventionally required to share large data pipeline-related files. As such, the JSON template may be easily sharable, however, may not include executable instructions for executing the implementation of the data pipeline itself.

Each code portion of the set of code portions, however, can correspond to a respective combination of the nodes and links of data pipeline architecture 510. For instance, the set of code portions may be predetermined code portions that include placeholder values (e.g., data types, labels, operations, user provided instructions/commands, etc.) for each node and link combination of the data pipeline architecture 510. For example, the JSON template may include an indication for first node 506a to be linked to second node 506b. For each of the nodes indicated in the JSON template, each node may be associated with a label, a data type, or one or more user provided/selected commands or instructions. For instance, in the JSON template, the first node 506a may be associated with a label of "Calendar" (e.g., identifying the data repository to which data is obtained from) and a data type of "data source" (e.g., indicating the node is associated with a data repository or data base). Second node 506b may be associated with a label of "Date" (e.g., indicating to obtain date(s) from a data source), a data type of "Select" (e.g., indicating the operation of the node is a select operation), and one or more user provided instructions/commands (e.g., criteria). For example, the one or more user provided instructions/commands may be used to instruct the node a date range of the data to obtain, or other dates, in accordance with one or more implementations of the present technology. As yet another example, the JSON template may also include an indication that first node 506a is linked to second node 506b.

Additionally or alternatively, in the JSON template, the first node 506a may be associated with a label of "Database Fetch" (e.g., identifying the database from which data is obtained) and a data type of "data source" (e.g., indicating the node is associated with a data repository or database). Second node 506b may be associated with a label of "Group" (e.g., indicating to generate a grouping of datasets, nodes, or other entities), a data type of "Array" (e.g., indicating a grouping operation defined by indices within an array), and one or more user provided instructions/commands (e.g., criteria for generating data groupings). For example, the one or more user provided instructions/commands may be used to instruct the node to generate a grouping of data associated with various databases, in accordance with one or more implementations of the present technology. As yet another example, the JSON template may also include an indication that first node 506a is linked to second node 506b.

Process 400 can use the JSON template to determine a code portion that corresponds to the combination of first node 506a and second node 506b being linked. For example, process 400 can select a predetermined code portion that links together a first node and a second node. Process 400 can use the data types indicated in the JSON template to identify a code portion that links together nodes of the respective data types. For instance, a predetermined code portion may link together a data type of "data source" and a data type of "select." Process 400 can parse through the set of predetermined code portions using the data types as indicated in the JSON template to determine a match between the data types of the predetermined code portions. Upon identifying a match, process 400 may select the predetermined code portion. It should be noted that other combinations of corresponding code portions linking nodes together may exist, and such example is exemplary.

To clarify, the JSON template may include information that is related to the data pipeline architecture 510, however, such information may not be executable within a computing environment. The predetermined code portions, however, include executable code that includes additional implementation details on how given nodes are linked (or otherwise connected) to other nodes, or additional input parameters from the JSON template (e.g., labels, criteria, user selectable commands, etc.). For instance, to enable users to create robust data pipelines who may be unskilled or unknowledgeable of how data pipelines are coded/implemented via source code, the predetermined code portions represent "implementable code" that may be pieced together to execute the created data pipeline architecture 510. That is, the predetermined code portions may be pieces of source code that may be put together, using labels included in the JSON template, to indicate which data sources data is being retrieved from, what user provided commands are associated with given nodes, what operations to perform on the data being obtained from a given source/node, and how the nodes are linked together. Furthermore, as each code portion may be predetermined, such code portions are tested and validated for functionality ensuring that when a data pipeline is created using the predetermined code portions, the data pipeline will be executed without error. In this way, the system optimizes data pipeline generation by using predetermined and pre-vetted (e.g., for errors) code portions as opposed to existing systems testing data pipeline implementations, thereby reducing the amount of computer processing and computer memory resources required to implement a data pipeline.

At act 410, process 400 can generate executable instructions associated with the data pipeline. For example, process 400 can generate executable instructions associated with the data pipeline architecture by using a transformation component configured to process the set of code portions with respect to the remote execution platform using the JSON object (e.g., template). As discussed above, process 400 may use the set of code portions to generate executable instructions for implementing the data pipeline. The executable instructions may be customized for the remote execution platform. For example, as the remote execution platform may be associated with its own requirements, the executable instructions may be customized to run (e.g., execute, host, or otherwise implement) the data pipeline.

In some implementations, process 400 can use a transformation component to generate the executable instructions associated with the data pipeline architecture. The transformation component may transform the JSON object and the associated code portions (e.g., the code portions corresponding to the JSON template) into executable instructions to execute on the remote execution platform. The transformation component may be part of a computing device (e.g., client computing device 302 (FIG. 3)) and may be hosted or installed on the computing device via a web-browsing application or other software application (e.g., application 212a of device 200 (FIG. 2)). In other implementations, the transformation component may be hosted on the web server providing the GUI, in accordance with some implementations of the present technology. For example, the transformation component may be a low code transformation component (e.g., as implemented as part of a software application) or may be a low code transformation layer (e.g., as implemented via a website or web server associated with the system). The benefit of using a low code transformation component is realized by the mechanism it operates. For example, the low code transformation component (e.g., transformation component), as discussed above, uses "low code" solutions to implement robust computing programs, such as data pipelines. Using low code platforms enables users that do not possess the specialized knowledge to implement robust software applications that were otherwise unattainable. By using the predetermined code portions, the low code transformation layer can generate and implement data pipelines (and other software applications) quickly and efficiently as opposed to existing systems.

The transformation component may be configured to receive, as input, the JSON template, the predetermined code portions, or the platform identifier and output executable instructions customized for the execution platform (e.g., the remote execution platform). The system may generate platform-agnostic data pipelines as the executable instructions for implementing the data pipelines are generated at runtime using predetermined code portions, the JSON template, and the platform identifier, thereby reducing the amount of computer processing and memory resources conventionally required to implement a data pipeline. Moreover, by generating such executable instructions during a runtime routine for any given platform, the system ensures widespread scalability and shareability of such pipelines as edits, updates, or changes to such data pipelines may be pushed and generated at runtime, thereby further reducing the amount of network traffic and computer processing and memory resources.

The transformation component can use the JSON template to piece together the predetermined code portions and generate the executable instructions in a computing language readable by the remote execution platform. For example, as discussed above, the JSON template may include information that is associated with the user selections indicating the data pipeline architecture (e.g., nodes, links, labels, user provided instructions/commands, data types, etc.). The transformation component may use such information and the predetermined code portions corresponding to the user selections to generate the executable instructions during a runtime routine. The advantage of the transformation component as opposed to existing systems is that the transformation component uses a generic format (e.g., in which the JSON template and the predetermined code portions are represented) and transforms the generic format into a format understood by the platform to which the data pipeline is to be implemented (e.g., hosted) on. That is, as opposed to requiring a specialized compiler to compile source code to be executable on a given platform, the transformation component uses the generic format of the JSON template and the predetermined code portions to generate executable instructions at runtime, in a language understood by the remote execution platform. In this way, the system enables data pipelines to be implemented on any platform, regardless of the technical requirements of the execution platform.

At act 412, process 400 can provide executable instructions to the remote execution platform. For example, process 400 can provide the executable instructions to the remote execution platform to host the data pipeline. To enable the data pipeline to be hosted on (e.g., executed on, ran on, process data on, etc.), process 400 may automatically transmit (e.g., via the Internet, one or more computing networks, etc.) the executable instructions to the remote execution platform. Additionally, process 400 can automatically execute (e.g., run the executable instructions) on the remote execution platform. In this way, the platform-agnostic data pipeline is automatically implemented on the remote execution platform, thereby reducing data pipeline implementation time delays and enabling users to obtain and analyze data faster than that of conventional systems.

In some implementations, process 400 can provide visual indications related to the data pipeline via a GUI. For example, referring back to FIG. 5, process 400 can provide visual indications of how many times a node is being used with respect to other nodes of other data pipelines. For instance, to provide users (e.g., data analysts, business professionals, etc.) with information regarding lineage tracking of data sources, databases, and data repositories being utilized, process 400 may generate visual indications of an amount of use regarding a given node. For instance, visual indicator 514 may indicate that the Calendar data source has been used twice with respect to other pre-generated data pipelines. That is, such visual indications may provide useful information to users building a data pipeline as to which data repositories are being utilized the most, and which data repositories should be focused on when analyzing data. Not only can such visual indications may provide useful information directed to which data repositories are utilized, but also how certain nodes, filters, or operations are being used in conjunction with the data pipelines and which nodes are in common with other data pipelines implemented via the system.

To accomplish this, process 400 may determine, from a set of pre-generated data pipelines, a set of common nodes. The set of common nodes may indicate nodes that are common to (i) nodes of the set of pre-generated data pipelines and (ii) the data pipeline (e.g., being created/implemented by the user). For example, the system may store JSON objects (e.g., templates) of the pre-generated data pipelines in a database associated with the system (e.g., database 308 (FIG. 3)). In this way, as opposed to storing the fully implemented source code of the pre-generated data pipelines, the system reduces the amount of computer memory required to store the pre-generated data pipelines. Process 400 may determine the set of common nodes by comparing each node of the data pipeline (e.g., the nodes of data pipeline architecture 510) to each node of the pre-generated data pipelines. Upon determining the set of common nodes, process 400 may determine an amount of common nodes respective to a given common node. For example, for a given node (e.g., first node 506*a*), process 400 may extract the label associated with the node (e.g., Calendar) and determine how many times the calendar node is used with respect to the pre-generated data pipelines. Process 400 may then generate for display, at the GUI (e.g., GUI 500), a visual indication indicating the amount of common nodes for the given common node. For example, the visual indication may be a numerical value, a color-coded shape, a geometrical object, or other visual indicator indicating the amount of times a given node is used with respect to the pre-generated data pipelines. In this way, the system provides users with lineage tracking information with respect to the usage of data repositories of data pipelines, thereby improving the user experience.

Facilitating Updates to Data Pipelines

Figure 6:
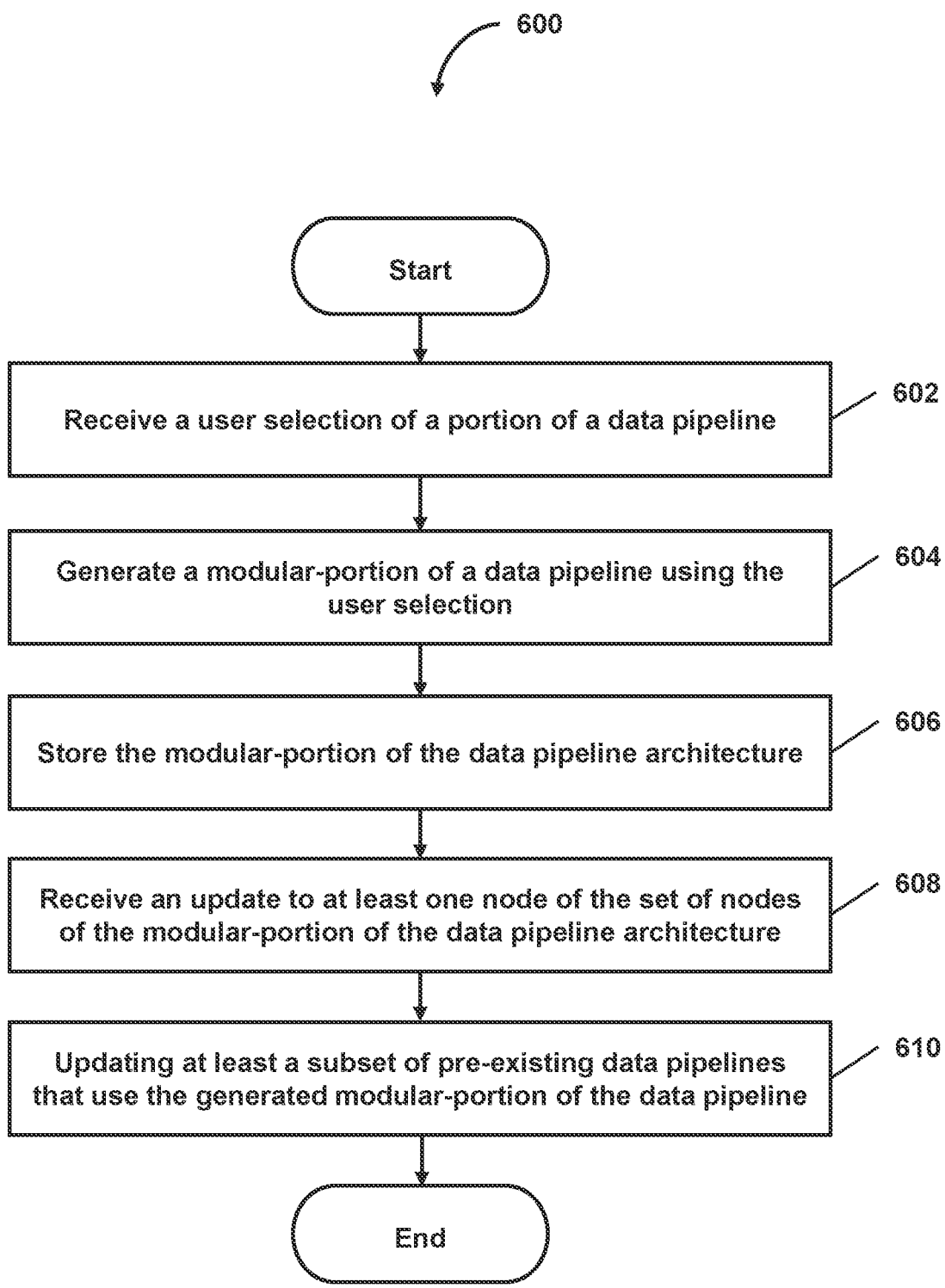
FIG. 6 is a flow diagram illustrating a process of facilitating updates to data pipelines using modularly-generated platform-agnostic data pipeline portions, in accordance with some implementations of the present technology.

FIG. 6 a flow diagram illustrating a process of facilitating updates to data pipelines using modularly-generated platform-agnostic data pipeline portions, in accordance with some implementations of the present technology.

At act 602, process 600 can receive a user selection of a portion of a data pipeline. For example, process 600 can receive, via a GUI, a user selection of a portion of a data pipeline. The user selection can include (i) a set of nodes each indicating a data pipeline component and (ii) a set of links linking the nodes. For instance, to generate a modular-portion of a data pipeline, the system (e.g., process 600) enables the user to select a portion of a data pipeline using an improved user interface. The GUI may be presented within a web-browsing application of a user device of the user. By presenting the GUI within a web-browsing application (e.g., that is communicatively coupled to one or more servers hosting the data pipelines for execution purposes), the users may have broader access to generating, configuring, changing, or updating data pipelines. For instance, where existing data pipeline generation programs are based on legacy software installed on specifically configured computers (e.g., to compile, execute, and run the data pipelines), the system displays an enhanced user interface (e.g., displayed via a website associated with a data pipeline service provider). In this way, the system enables non-technically savvy users to configure data pipelines via a visual interface (e.g., as opposed to a text editor or integrated software development tool that specifically shows the underlying code) while not requiring access to specifically configured computers.

The user selection(s) may indicate a set of nodes (e.g., each indicating a data pipeline component) and a set of links that link the set of nodes (e.g., together, to other nodes, to other components, etc.). For example, as described in act 402 of process 400 (FIG. 4), the user selections of the nodes and links may be performed in a "drag and drop" fashion. For example, upon being presented with a data pipeline (or data pipeline architecture), the system may enable users to select one or more nodes (and the links linking the selected nodes) using a pointing device. The nodes may indicate one or more data pipeline components, such as operations or data sources, that are involved with the data pipeline (e.g., as described with respect to FIG. 1).

Figure 7A:
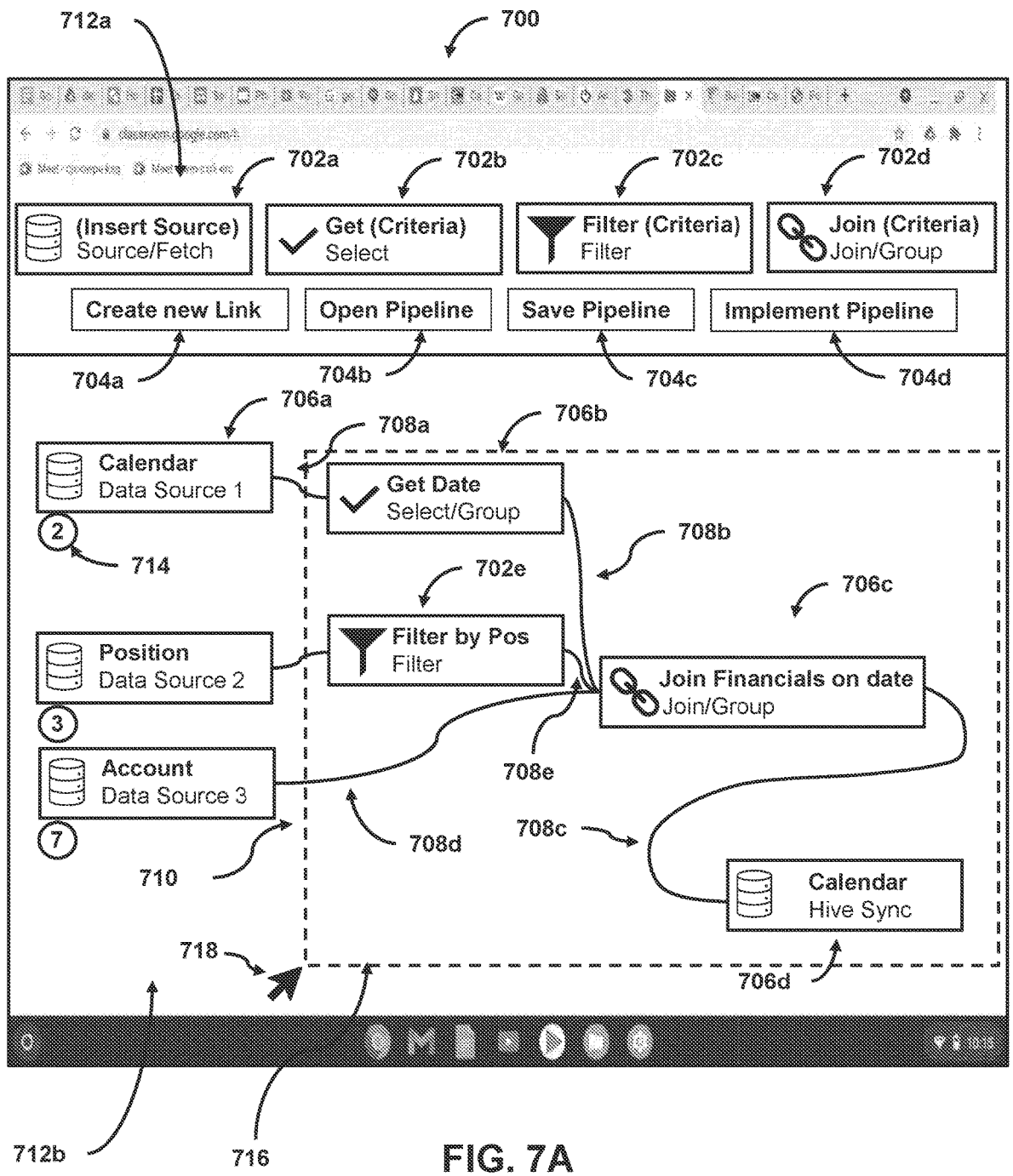
FIGS. 7A-7C shows an illustrative representation of a GUI for selecting a modular-portion of a platform-agnostic data pipeline, in accordance with some implementations of the present technology.

Referring to FIG. 7A, FIG. 7A shows an illustrative representation of a GUI for selecting a modular-portion of a platform-agnostic data pipeline, in accordance with some implementations of the present technology. GUI 700 can be provided via a website associated with a data pipeline service provider (e.g., as described in act 402). In some implementations, GUI 700 may correspond to GUI 500, where node buttons 502a-502d correspond to second node buttons 702a-702d, command buttons 504a-504d may correspond to second command buttons 704a-704d, first node 506a may correspond to fifth node 706a, second node 506b may correspond to sixth node 706b, third node 506c may correspond to seventh node 706c, fourth node 506d may correspond to eighth node 706d, first link 508a may correspond fourth link 708a, second link 508b may correspond to fifth link 708b, third link 508c may correspond to sixth link 708c, data pipeline architecture 510 may correspond to second data pipeline architecture 710, first portion 512a of GUI 500 may correspond to third portion 712a of GUI 700, second portion 512b of GUI 500 may correspond to fourth portion 712b of GUI 700, and visual indicator 514 may correspond to second visual indicator 714. For example, GUI 500 and GUI 700 may represent the same or similar user interface as each other for presenting, displaying, or otherwise providing a data pipeline architecture.

In some implementations, a data pipeline architecture (e.g., second data pipeline architecture 710) may be presented via GUI 700 to the user. To receive the user selection 716 of a portion of the data pipeline architecture that indicates user selected nodes and links, the system uses a pointing device 718 to select the user selection 716. As an example, pointing device 718 may be a cursor, although it will be appreciated by one of ordinary skill in the art that pointing device 718 may not be limited to a cursor and that other mechanisms for selecting the user selection 716 may be used, in accordance with one or more implementations of the present technology. For instance, a user may use a mouse, touch screen, touch pad, or other input device or sensors (e.g., gesture recognition sensors, eye tracking sensors, etc.) that may receive a user's selection of a portion of a data pipeline. User selection 716 of the portion of the data pipeline may include a set of nodes and a set of links linking the nodes. For example, user selection 716 may include sixth node 706b, seventh node 706c, eighth node 706d, ninth node 706e, fifth link 708b, sixth link 708c, seventh link 708d, and eighth link 708e, thereby indicating the user selection of a portion of the data pipeline.

Referring back to FIG. 6, at act 604, process 600 can generate a modular-portion of a data pipeline using the user selection. For example, process 600 can generate a modular-portion of the data pipeline architecture, via a transformation component, based on the user selection. For example, when the system receives a user selection of a portion of a data pipeline, the system can generate a modular-portion of the data pipeline architecture using a transformation component. For example, the system may use the set of nodes and links (e.g., as indicated in the user selection) as a basis for generating a platform-agnostic modular-portion of the data pipeline architecture. For instance, the system may generate the platform-agnostic modular-portion of the data pipeline architecture by using one or more processes as that may be the same or similar to as those described in acts 404-410 of FIG. 4, in accordance with one or more implementations of the present technology. As an example, in lieu of user creating a data pipeline scratch (e.g., as in such implementation, the data pipeline may already be created), the system may generate a new instance of the data pipeline using the user-selected portion of the data pipeline to store for future use. As the user-selection indicates a sub-data pipeline (e.g., a portion of a data pipeline) which can be platform-agnostic, the system can generate a platform-agnostic modular portion of the data pipeline architecture to reuse such modular portion in future-created data pipelines—thereby reducing the amount of wasted computational resources traditionally used when generating data pipelines from scratch.

Referring back to FIG. 7A, the system may generate a modular-portion of second data pipeline architecture 710 that is based on the user selection 716 by using the transformation component as described in process 400 (FIG. 4). For example, process 600 may use the user selection 716 that indicates the user selections of the set of nodes indicating data pipeline components and the set of links linking the nodes to determine (i) JSON object associated with the user selections, (ii) determine a set of code portions, (iii) and generate executable instructions based on the set of code portions, to generate the modular-portion of the data pipeline architecture, via the transformation component, based on the user selection as described in process 400 (FIG. 4).

Referring back to FIG. 6, at act 606, process 600 can store the modular-portion of the data pipeline architecture. For example, process 600 can store the modular-portion of the data pipeline architecture in a remote database. For instance, to ensure reusability of the modular-portions of the data pipeline architecture, the system may store the generated modular-portions of the data pipeline architecture in a remote database. The remote database may be any database configured to store modular-portions (e.g., platform-agnostic modular-portions) of data pipeline architectures, such as databases 308, 312*a-c* (FIG. 3). In some implementations, process 600 may store JSON objects that are associated with the user selection(s) of the modular-portions of the data pipeline architecture in the remote database (e.g., as opposed to the executable instructions corresponding to the modular-portion of the data pipeline architecture) to remain platform-agnostic and deployable to any platform a user selects or indicates. In other implementations, process 600 may store the executable instructions corresponding to the modular portion of the data pipeline architecture to reduce compilation times associated with compiling the set of code portions for a given platform—thereby further reducing the amount of computational resources required to deploy the modular-portion of the data pipeline architecture to computing platforms.

Figure 7B:
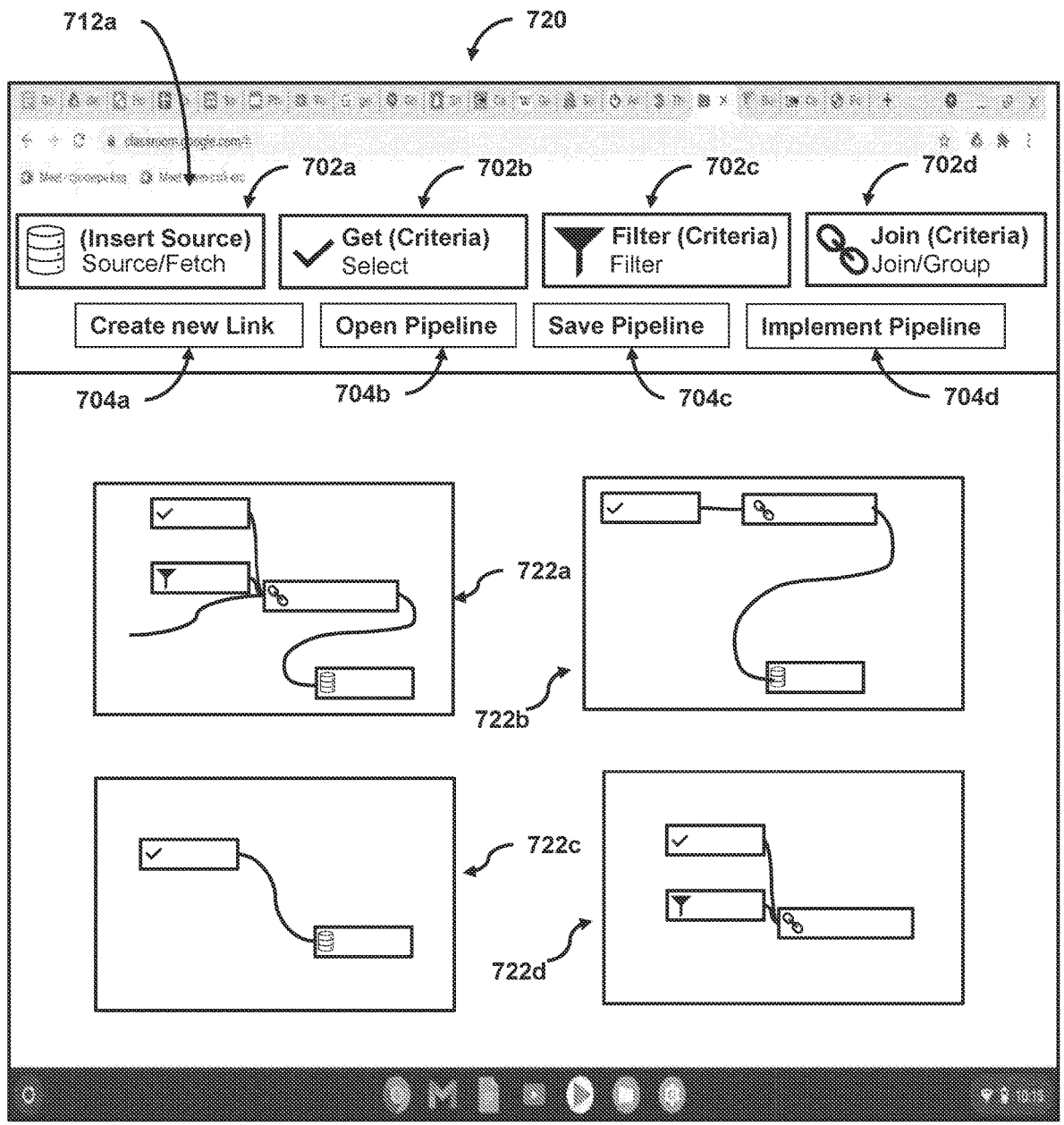

In some implementations, process 600 may receive a user selection of a pre-generated modular-portion of a data pipeline architecture. For example, to reduce deployment times and reduce the amount of computational resources expended when generating data pipelines, the system may leverage pre-generated modular portions of data pipeline architectures to enable users to quickly and efficiently create data pipelines. For example, process 600 can receive, via the GUI, a user selection of a modular-portion of a second data pipeline architecture, where the modular-portion of the data pipeline architecture is (i) stored in the remote database and (ii) is pre-generated. For example, referring back to FIG. 7A, a user may select second command button 704*b* indicating "open pipeline." Referring to FIG. 7B, a user may be presented with GUI 720 which shows stored, pre-generated modular-portions of data pipeline architectures. For example, modular portions 722*a*-722*d* may indicate stored, pre-generated modular-portions of data pipeline architectures that may be reused. For example, first modular portion 722*a* may correspond to the generated modular-portion of the data pipeline architecture that was based on user selection 716 (FIG. 7A). The user may select a modular-portion of a data pipeline architecture (e.g., modular portion 722*b*) to be linked to a working draft of a data pipeline (e.g., second data pipeline architecture 710 (FIG. 7A). In this way, the user may reuse pre-generated modular-portions of data pipelines to reduce deployment time and conserve computational resources traditionally required to generate data pipelines from scratch.

Figure 7C:
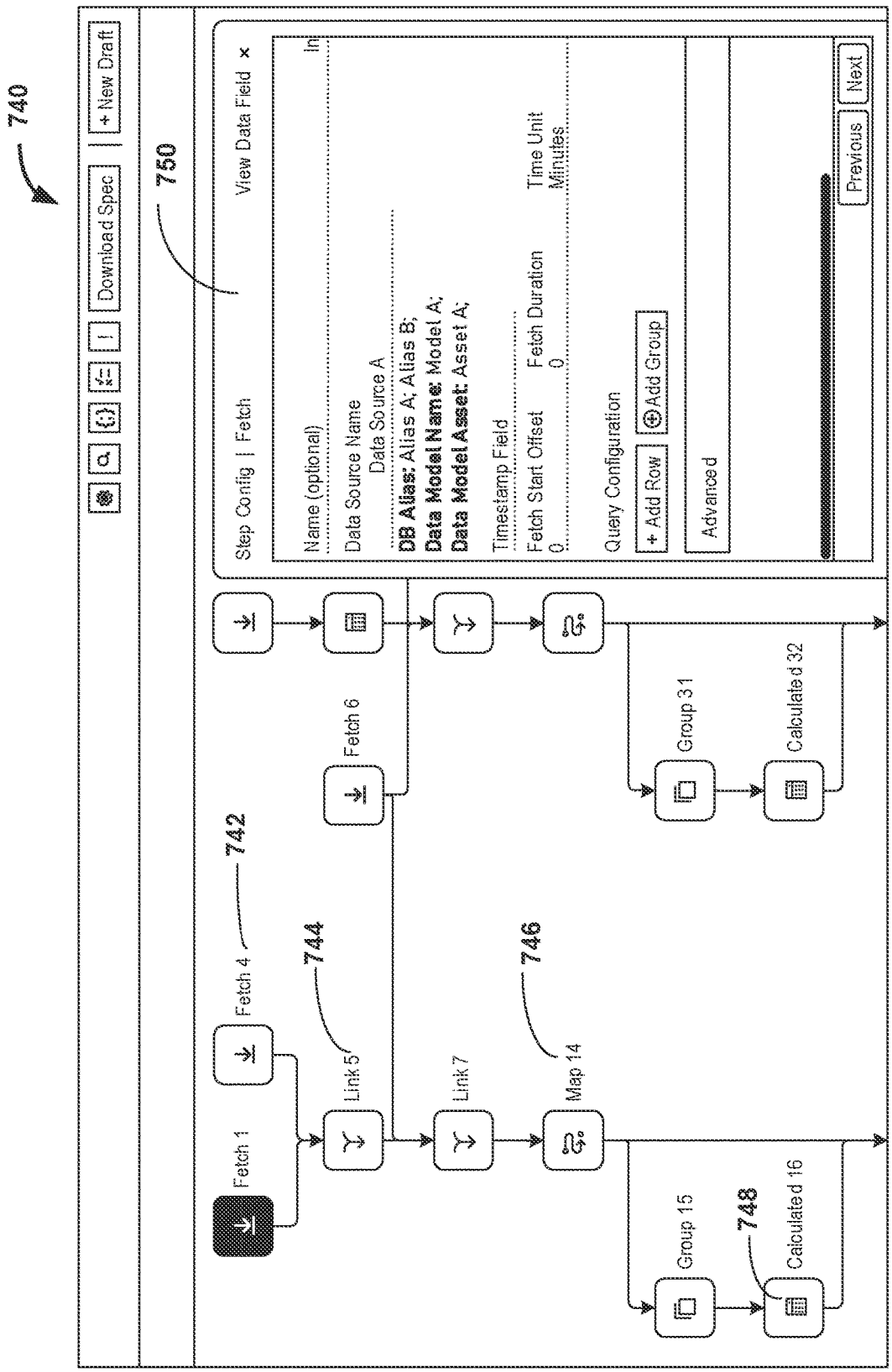

Referring to FIG. 7C, a user may be presented with a GUI 740 which shows stored, pre-generated modular-portions of data pipeline architectures. The node 742 can include a "Fetch" operation that enables retrieval of data from a specified database. For example, the user can specify a data source associated with the "Fetch" operation using a configuration menu 750. The node 744 can include a "Link" operation that groups, combines, or joins data from different databases and/or of different formats. The node 746 can include a "Map" operation that transforms, integrates, or links data (e.g., from different data sources into a unified, standardized, or specified format). The node 748 can include a "Calculated" operation that calculates, analyzes, normalizes, or otherwise processes data. Operations associated with nodes (e.g., node 742, 744, 746, and/or 748) can include associated configuration menus (e.g., the configuration menu 750) enabling specification, configuration, and/or modification of operations via the GUI 740.

The user may then link the selected modular-portion to the working draft of the data pipeline using one or more processes as described in act 402 of process 400 (FIG. 4). In response to linking the selected modular-portion to the working draft of the data pipeline, the system may generate, via the transformation component, an updated version of the working draft of the data pipeline using (i) the data pipeline and (ii) the selected modular-portion of the data pipeline architecture. For example, the system may generate an updated version of the working draft of the data pipeline using one or more processes as described in acts 402-410 of process 400 (FIG. 4).

Figure 8:
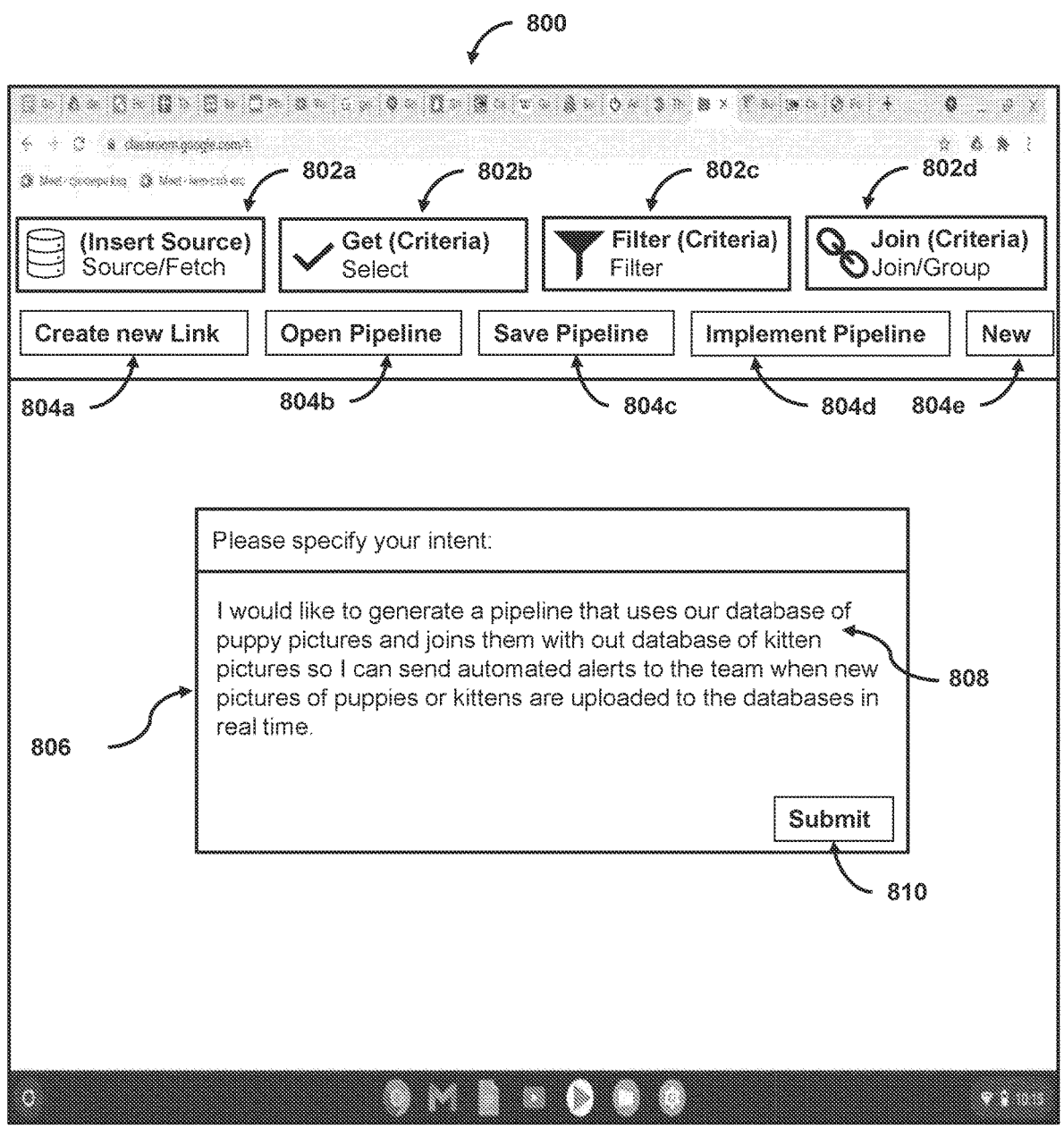
FIG. 8 shows an illustrative representation of a GUI for accepting a user prompt to generate a platform-agnostic data pipeline, in accordance with some implementations of the present technology.

In some implementations, a data pipeline may be generated based on a large language model (LLM) prompt. For example, in some implementations, a data pipeline (e.g., second data pipeline architecture 710) may be generated based on a user prompt indicating an intended output. For instance, as non-technically savvy users may not have the required knowledge to know how to create a data pipeline, know which data sources they need to use, what environments to deploy the data pipeline in, or other considerations, the users may provide a textual indication to an LLM to generate a draft pipeline. For example, process 600 may receive, via a GUI, a user defined prompt indicating an intended data pipeline output result. For example, the intended data pipeline result may be an intent of the user (e.g., a goal, a specific task, something to achieve, etc.). Referring to FIG. 8, showing an illustrative representation of a GUI for accepting a user prompt to generate a platform-agnostic data pipeline, in accordance with some implementations of the present technology, GUI 800 is shown. GUI 800 may include third node buttons 802*a*-802*d*, third command buttons 804*a*-804*e*, user defined prompt 806, intended result 808, and action button 810. In some implementations, third node buttons 802*a*-802*d* may correspond to second node buttons 702*a*-702*d* and third command buttons 804*a*-804*d* may correspond to second command buttons 704*a*-704*d* of FIG. 7A. A user may provide an intended result 808 into user defined prompt 806. For instance, the intended result may indicate a "result" or "desired output" that the user would like to achieve, however, the user may not have the required knowledge to achieve that output. As such, the user may select action button 810 to submit the prompt to the LLM for further processing.

Figure 9:
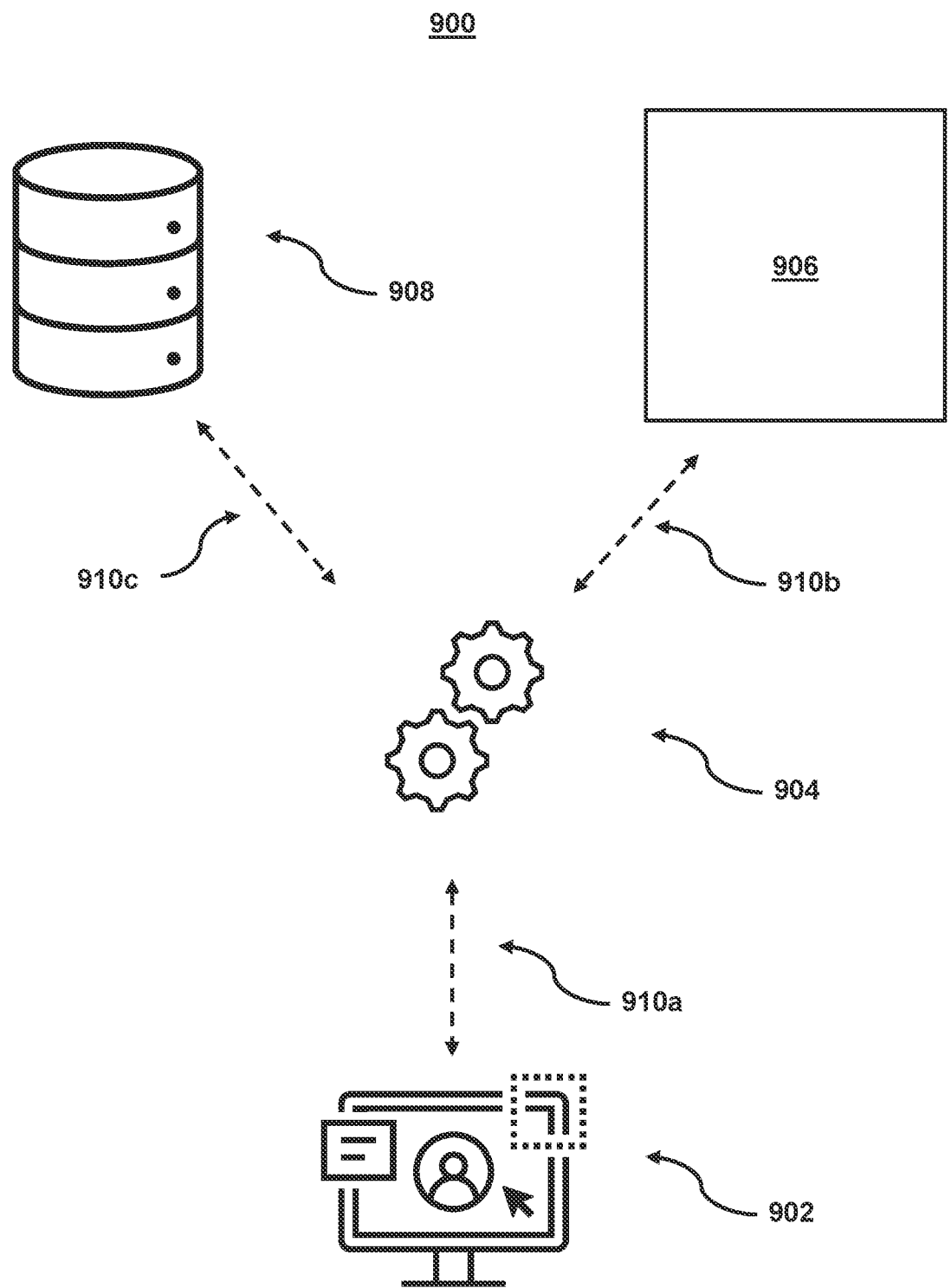
FIG. 9 shows a subsystem diagram of an LLM communicatively connected to a generative artificial intelligence model configured to generate data pipeline component configurations, in accordance with some implementations of the present technology.

The system may can provide the user defined prompt indicating the intended data pipeline output result to a LLM trained to provide recommended data pipeline architectures based on the intended data pipeline output result. For example, the LLM may be communicatively coupled to a generative model configured to provide data pipeline component configurations based on historical data-pipeline architectures. Referring to FIG. 9, which shows a subsystem diagram of an LLM communicatively connected to a generative artificial intelligence model configured to generate data pipeline component configurations, in accordance with some implementations of the present technology, the system may provide the user defined prompt to the LLM model. Architecture 900 shows a computing device 902 which may correspond to a device that presents GUIs 500, 700, 800, 900 or other GUIs, an LLM 904, generative model 906, database 908, and communication links 910*a*-910*c*. Architecture 900 can be part of environment 300 (FIG. 3).

LLM 904 can be any large language model (e.g., an artificial intelligence model) that is designed to process and understand natural language. LLM 904 may be a pre-trained LLM that is trained on a large corpus of text data using advanced machine learning algorithms to learn patterns and relationships between words, phrases, and sentences. LLM 904 may extract from the user defined prompt, one or more keywords that are associated with a data pipeline. For example, LLM 904 may determine database identifiers, operations to be performed, a final output result, or other resources or output indications that are present in a user defined prompt.

Generative model 906 can be any generative model that is designed to generate new data. For example, generative model 906 may generate data pipeline component configurations based on historical data pipeline-architectures. Generative model 906 may be trained to accept input data generated as output from the LLM (e.g., database identifiers, operations, final output results, etc.) to generate a data pipeline component configuration. The generative model may generate a data pipeline configuration by accessing database 908 that stored historically-created data pipeline architectures. In some implementations, generative model can be generative model 222 that is described in U.S. patent application Ser. No. 18/535,001, filed on Dec. 11, 2023, titled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA" which is incorporated by reference in its entirety.

Each of computing device 902, LLM 904, generative model 906, and database 908, are able to communicate via communication links 910a-910c. Communication links 910a-910c may include the Internet, a mobile phone network, a mobile voice or data network (e.g., a 5G or LTE network), a cable network, a public switched telephone network, or other types of communications networks or combinations of communications networks. Communication links 910a-910c may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

In some implementations, the system can utilize NLP techniques, such as contextual embeddings and transformer models for improved prompt interpretation. For example, the system leverages transformer-based models (e.g., a bidirectional encoder representation from transformers (BERT) or a robustly optimized BERT pre-training approach (RoBERTA) model) to generate semantic representations of the user defined prompt. by generating contextual embeddings and/or by integrating transformer models, the system improves the handling of poorly worded or incomplete prompts, thereby improving the accuracy and resilience of the system to generate recommended data pipeline architectures.

In some implementations, the system can fine-tune the LLM in a domain-specific manner to improve the customization and accuracy of the generation of application-specific data pipeline architectures. For example, the system can fine-tune a pre-trained version of the LLM 904 based on domain-specific data (e.g., using training data that includes data pipeline terminology and/or relevant examples of code portions) to tailor the LLM toward a target application (e.g., as specified within the user defined prompt). By doing so, the system enables users to label prompts such that the LLM can select a domain and an appropriate fine-tuned knowledge base accordingly.

In some implementations, the system can utilize a prompt analysis algorithm to evaluate prompts dynamically (e.g., during the user's text input within a text-box associated with the user defined prompt). For example, the system can evaluate prompts as typed by the user and generate a prediction for a complete prompt. As an illustrative example, the system obtains a partial user-defined prompt (e.g., as typed within a text-box of the GUI 800). Based on providing the partial prompt to a text prediction engine, the system can predict a next word, phrase, or other natural language token. For example, the system outputs relevant domain terms and prompt structures based on prior user-defined prompt data. The text prediction engine can implement domain-specific rules for generation of domain-specific predictions of the user-defined prompt based on the partial prompt.

Upon providing the user-defined prompt to the LLM, the system may receive, via a GUI, the data pipeline, where the data pipeline is generated using a first data pipeline component configuration received from the generative model. For example, similar to that of the scripts received in U.S. patent application Ser. No. 18/535,001, the generative model may receive one or more keywords that are associated with a data pipeline. The generative model may then process the one or more keywords to generate a data pipeline architecture. The generative model may be trained on different keyword-historical data pipeline combinations as stored in database 908 to generate the data pipeline architecture. In some implementations, to increase accuracy of generating the data pipeline architecture, the system may determine one or more performance metrics of the generated data pipeline architecture to determine whether to deploy to provide the generated data pipeline architecture back to the user, or rather, regenerate the data pipeline architecture. Such performance metrics may be generated in the same or similar fashion as those described in in U.S. patent application Ser. No. 18/535,001. The system may then receive, via a GUI, the generated data pipeline, where the data pipeline is generated using a first data pipeline component configuration received from the generative model. In this way, the system may generate draft or recommended data pipelines for non-technically savvy users, thereby reducing wasted computational resources traditionally experienced in connection with re-writing and re-creating data pipelines.

In some implementations, the system improves suggestions for data pipeline architectures by supplementing user-defined prompts with relevant information. For example, the system accesses structured knowledge bases or unstructured domain-specific text (e.g., technical documentation) to obtain or retrieve relevant context and data. By integrating this retrieved information into the user-defined prompt, the system can provide an updated prompt to the LLM for generation of the data pipeline architecture (e.g., data pipeline component configurations) for improved, tailored prediction of data pipeline architectures.

In some implementations, the system generates meta-code or executable code based on the user-defined prompt. To illustrate, the system can translate natural language queries into meta-code using the LLM 904 and/or compile an executable code or query using the meta-code. For example, the system translates the user-defined prompt or other natural language queries into an intermediate representation (e.g., meta-code) that captures a logic or architecture of a data analysis associated with the prompt. The system can convert this meta-code into an executable database query (e.g., for a Structured Query Language (SQL) database) or programming language code (e.g., python within an environment that includes relevant data manipulation libraries).

As such, the system enables the automation of data analysis for generation of code snippets on the basis of user-provided prompts, thereby improving the flexibility and modularity of the data pipeline architecture and modifications thereof.

In some implementations, the system generates recommendations for a new GUI (or modifications to an existing GUI) based on user interaction patterns. For example, the system can obtain, receive, or detect user interaction patterns with an existing GUI to generate recommendations for GUI enhancements (and/or to generate the enhanced GUI), thereby enabling improvements and simplifications to the user experience. In some implementations, the system can generate documentation or suggestion for developers for the optimization of LLM use and prompt engineering (e.g., based on training data that includes user-defined prompts and evaluations of corresponding generated data pipeline architectures).

Referring back to FIG. 6, at act 608, process 600 can receive an update to at least one node of the set of nodes of the modular-portion of the data pipeline architecture. For example, process 600 can receive an update to at least one node of the set of nodes indicating a first data pipeline component of the modular-portion of the data pipeline architecture. The update may be an update associated with a node of the modular-portion of the data pipeline, such as an update to which type of operation is being performed, an updated threshold value, an updated user-selectable command, an update to a parameter associated with the node, the removal of the node, an addition of the node, a re-linking of the node to a different node (or no node), or other update.

When a modular-portion of the data pipeline architecture is generated, the system may monitor for updates to any of the nodes or links associated with that modular-portion. For example, as each generated modular-portion of the data pipeline architecture is stored (e.g., to be reused in other data pipelines), the system may detect when an update occurs to a master copy of the modular-portion of the data pipeline architecture in the database to which it is stored. For example, the master copy may refer to the modular-portion of the data pipeline architecture that is stored in the database for future use. In other implementations, however, the system may detect when an update occurs to an instance of the modular-portion of the data pipeline architecture. For example, an instance of the modular-portion of the data pipeline architecture may refer to the scenario where the modular-portion of the data pipeline architecture is used within a data. As the modularly-generated data pipeline architectures can be reused across multiple, disparate, computational environments and systems, when an update is detected to any of the modularly-generated portions, the system can incorporate the change to a subset or all of the data pipelines that use the respective modular portion. In this way, the system may reduce update errors that are traditionally experienced when updating multiple copies of the data pipelines (e.g., as the update can be pushed to each data pipeline that uses the modular-portion, whether deployed or not).

At act 610, process 600 can update at least a subset of pre-existing data pipelines that use the generated modular-portion of the data pipeline. For example, process 600 can update at least a subset of a set of pre-existing data pipelines that use the generated modular-portion of the data pipeline to incorporate the update to the at least one node of the set of nodes indicating the first data pipeline component. As discussed above, when an update is received, detected, or otherwise performed to the modular-portion of the data pipeline, the system may provide the update to at least a subset of data pipelines that use the modular-portion of the data pipeline. To do so, the system can determine a set of pre-existing data pipeline architectures that use the generated modular-portion of the data pipeline.

Process 600 can access the database that stores generated modular-portions of data pipelines to retrieve a message (e.g., a configuration file) that indicates the locations, systems, users, and pipelines that use the generated modular-portion of the data pipeline architecture, as well as if those locations, systems, or users accept or reject updates to pipelines. The message may include identifiers that identify those locations, systems, or users. For example, a first user may be associated with a data pipeline that uses the generated modular portion of the data pipeline architecture and accepts any updates to the modular-portion of the data pipeline architecture (when made). As another example, a second user may be associated with a data pipeline that uses the generated modular portion of the data pipeline architecture but rejects any updates to the modular-portion of the data pipeline architecture (when made). Additionally or alternatively, accepting or rejecting updates can be based on a type of update such as a user-selectable command update, a threshold value update, a parameter update, an operation update, a linkage update, or other type of update relevant to the generated modular portion of the data pipeline architecture. In some implementations, process 600 may update data pipelines (e.g., pre-existing, deployed, etc.) that use the generated modular-portion of the data pipeline architecture with those having an indication to accept updates, in lieu of those data pipelines that are associated with an indication to reject updates.

Process 600 may parse the message and determine a set of data pipelines that use the generated modular-portion of the data pipeline to incorporate (e.g., push, provide, execute, etc.) the update to. For example, where the update to a filter operation node of the modular-portion of the data pipeline is updating a date value (e.g., when filtering by date), the system may provide the updated date value to each data pipeline that (i) uses the modular-portion of the data pipeline to which the update is intended for and (ii) that accepts the update. Process 600 may provide the update to the set of data pipelines that use the generated modular-portion of the data pipeline by determining the identifier (e.g., from the message described above) and transmitting an update message including update information of the update to the respective locations, systems, or users (e.g., via an IP address, email, text message, real-time update protocol, etc.). In this way, the system reduces update times to date pipelines as updates to a modular-portion are automatically pushed to each data pipeline that use the modular-portion—thereby reducing wasted computational resources and enhancing the user experience (e.g., as maintenance efforts are reduced).

In some implementations, the system can update the links that connect one or more nodes of the modular-portion of the data pipeline. For example, in response to receiving the update to the at least one node of the set of nodes indicating the first data pipeline component of the modular-portion of the data pipeline architecture, process 600 may determine that the update to the at least one node is associated with a second update to a link that links the at least one node to another node of the modular-portion of the data pipeline architecture. For instance, not only may the nodes themselves be updated, but the links that link one node to another node of the generated modular portion may also be updated. Linkage updates (e.g., updates to the way nodes are linked together) within a modular-portion of a data pipeline is important to factor in as these types of updates may alter the flow of information of how one node receives and outputs data. As such, in some implementations, the message that indicates the locations, systems, users, and pipelines that use the generated modular-portion of the data pipeline architecture, as well as if those locations, systems, or users accept or reject updates to pipelines, may also include information as to whether to accept or reject linkage updates.

In response to determining that the update to the at least one node is associated with the second update to the link that links the at least one node to the other node of the modular-portion of the data pipeline architecture, process 600 can update the subset of the set of pre-existing data pipelines to incorporate the second update to the link that links the at least one node to the other node of the modular-portion of the data pipeline architecture. That is, process 600 may update each data pipeline that uses the modular-portion of the data pipeline architecture with the linkage update.

In some implementations, process 600 can transmit a message indicating an update to the data pipelines that use the modular-portion of the data pipeline architecture. For example, in response to receiving the update to the at least one node of the set of nodes indicating the first data pipeline component of the modular-portion of the data pipeline architecture, process 600 transmits a message to each of the set of pre-existing data pipelines that use the generated modular-portion of the data pipeline indicating the update to the at least one node of the set of nodes indicating the first data pipeline component. The message may be notification that notifies each location, system, or user that is associated with a data pipeline that uses the generated modular-portion of the data pipeline architecture, that an update is about to occur, has occurred, or will occur. The notification may be transmitted based on the identifiers in the message (e.g., as described above). In some implementations, the notification may include an indication as to whether the user would like to accept the update, or reject the update. By doing so, the system enables control over whether updates may be effectuated to individual date pipelines, thereby acting as a final verification as whether to accept the update or not. In this way, the system may enhance the user experience by notifying users of potential changes to their data pipelines.

In some implementations, process 600 may test the modular-portion of the data pipeline architecture during a test routine. For example, process 600 may retrieve the modular-portion of the data pipeline architecture from the remote database. Process 600 may then extract an identifier corresponding to each node of the set of nodes of the modular-portion of the data pipeline architecture to determine a respective data pipeline component type. For instance, the data pipeline component type may refer to a type of operation/data source that the node is (e.g., a join operation, a database, a filter operation, etc.). Each node of the set of nodes may be associated with an identifier that identifies their component type as described with respect to FIG. 1. Process 600 may provide the determined data pipeline component type corresponding to each node of the set of nodes of the modular-portion of the data pipeline architecture to an artificial intelligence model to generate a set of test cases. The set of test cases may include test code to test the modular-portion of the data pipeline architecture. For example, process 600 may provide the determined data pipeline component types of all of the nodes that are part of the modular-portion to the artificial intelligence model to generate the set of test cases. The set of test cases may be used to test different edge cases of nodal operations. For instance, the artificial intelligence model may be used to generate test cases that test differing parameters, user selectable commands, threshold values, or other values that may impact the performance of the data pipeline. Process 600 may provide the set of test cases to the modular-portion of the data pipeline architecture during a test routine. By doing so, the system may test modular-portions of the data pipeline architecture—thereby reducing wasted computational resources involved with deploying or publishing error-prone data pipelines.

Figure 10:
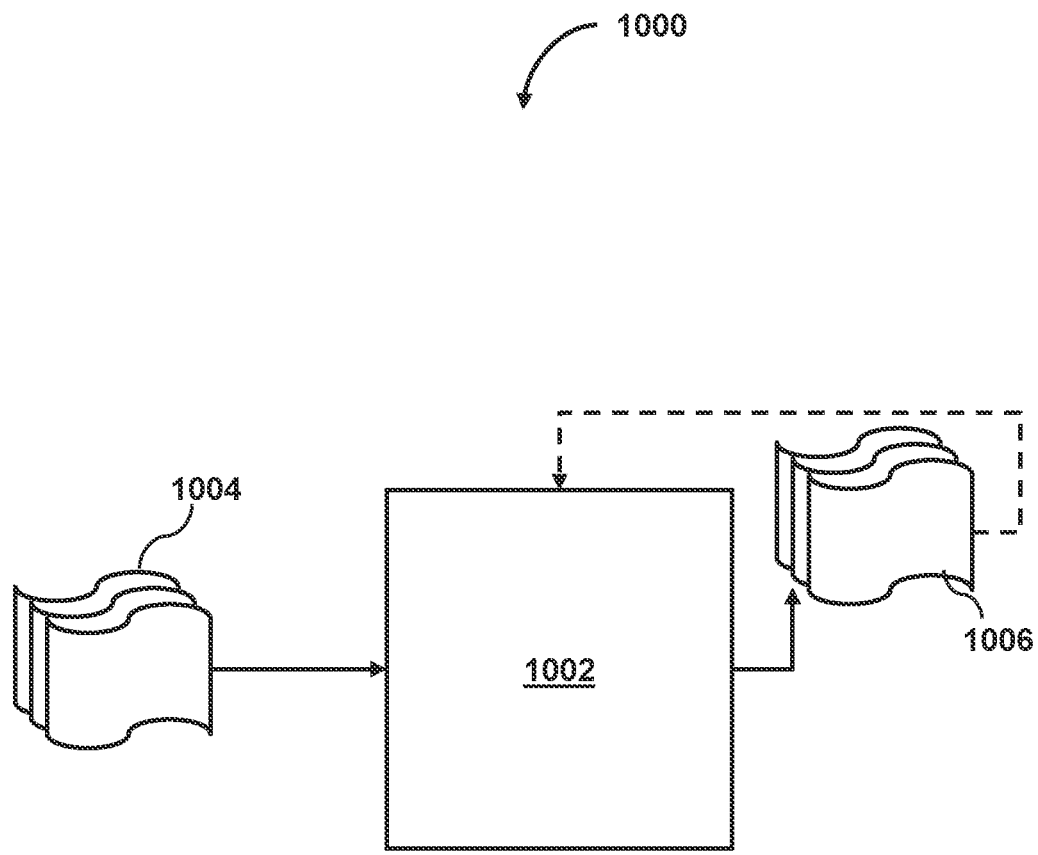
FIG. 10 shows a diagram of an artificial intelligence model, in accordance with some implementations of the present technology.

Referring to FIG. 10 showing a diagram of an artificial intelligence (AI) model, in accordance with some implementations of the present technology, AI model 1000 is shown. In some implementations, AI model may be any artificial intelligence model. In some implementations, AI model 1000 can be part of, or work in conjunction with server computing device 106 (FIG. 1). For example, server computing device 106 can store a computer program that can use information obtained from AI model 1000, provide information to AI model 1000, or communicate with AI model 1000. In other implementations, AI model 1000 may be stored in database 108 and may be retrieved by server computing device 106 to execute/process information related to AI model 1000, in accordance with some implementations of the present technology.

In some implementations, AI model 1000 may be a machine learning model 1002. Machine learning model 1002 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, with respect to FIG. 10, machine learning model 1002 can take inputs 1004 and provide outputs 1006. In one use case, outputs 1006 may be fed back to machine learning model 1002 as input to train machine learning model 1002 (e.g., alone or in conjunction with user indications of the accuracy of outputs 1006, labels associated with the inputs, or with other reference feedback information). In another use case, machine learning model 1002 may update its configurations (e.g., weights, biases, or other parameters) based on its assessment of its prediction (e.g., outputs 1006) and reference feedback information (e.g., user indication of accuracy, reference labels, or other information). In another use case, where machine learning model 1002 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 1002 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 1002 can be trained based on information stored in database 108 to generate test cases, test case code, or other information. For example, database 108 may include information such as historical information, data pipeline component types, data pipeline architecture configurations, parameter values, threshold values, update information, test code, test cases, result information, or other information. The information may associated with a given outcome (e.g., test code, test cases, or other output) to train the machine learning model 1002 using a supervised-learning technique. However, in some implementations, machine learning model 1002 may be trained using an unsupervised-learning technique.

For example, machine learning model 1002 can take a first set of information as input 1004. The first set of information can include data pipeline component types, data pipeline architecture configurations, parameter values, threshold values, update information, test code, test cases, result information, or other information. Machine learning model 1002 may take the first set of information as input 1004 and generate an output 1006 indicating test cases for the set of data pipeline components. For instance, machine leaning model 1002 may learn relationships between the inputs 1004 to generate test cases. In some implementations, output 1006 may be fed back into machine learning model 1002 to update one or more configurations (e.g., weights, biases, or other parameters) based on its assessment of its prediction (e.g., outputs 1006) and reference feedback information (e.g., user indication of accuracy, reference labeled, ground truth information, or other information).

In some implementations, process 600 may automatically update the modular-portion of the data pipeline architecture based on a determined anomaly (e.g., a detected error). For example, process 600 can receive the set of test case results in response to providing the set of test cases to the modular-portion of the data pipeline architecture during the test routine. The test case results may be a set of results that are outputted from the modular-portion of the data pipeline architecture in response to the test cases, or may be a set of results that are outputted from a given component (e.g., node) of the modular-portion of the data pipeline architecture. Process 600 can then parse the set of test case results to identify an anomaly included in the test case results. For instance, the anomaly may be an error, mistake, inaccuracy, miscalculation or other anomaly associated with wither a given node of the modular-portion of the data pipeline architecture, or the modular-portion of the data pipeline architecture in its entirety.

Process 600 may determine (i) a type of anomaly corresponding to the identified anomaly and (ii) a corresponding data pipeline component of the modular-portion of the data pipeline architecture. Process 600 may then update the determine corresponding data pipeline component of the modular-portion of the data pipeline architecture with an updated parameter to resolve the type of anomaly corresponding to the identified anomaly. For instance, process 600 may generate (e.g., via a rules engine, artificial intelligence model, generative model, machine learning model, etc.) an updated parameter (e.g., an update parameter, recommended update parameter) that will resolve the anomaly. For instance, the update parameter may be a user-selectable command, a threshold value, or other parameter that, when in effect, will resolve the current anomaly/error present within the modular-portion of the data pipeline architecture. For instance, the update parameter may be generated via an artificial intelligence model configured to output recommended update parameters based on input data of (i) the type of error corresponding to the identified error, (ii) the corresponding data pipeline component, and (iii) other information. In this way, the system may identify and resolve errors in real or near-real time, thereby reducing the amount of wasted computational resources traditionally experienced when error-prone data pipelines are deployed.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed in parallel or implemented in parallel or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for facilitating updates to data pipelines using modularly-generated platform-agnostic data pipeline portions, the system comprising:
   at least one processor; and
   at least one memory coupled to the at least one processor and storing instructions that, when executed by the at least one processor, perform operations comprising:
      receiving, via a graphical user interface (GUI) within a web-browsing application, a user selection of a portion of a platform-agnostic data pipeline comprising: (i) a set of nodes each indicating a data pipeline component and (ii) a set of links each linking two or more nodes of the set of nodes;
      generating via a transformation component and using the user selection, a platform-agnostic modular-portion of a data pipeline architecture;
      storing the generated platform-agnostic modular-portion of the data pipeline architecture in a remote database configured to store platform-agnostic modular-portions of data pipeline architectures;
      receiving an update to at least one node of the set of nodes indicating a first data pipeline component of the generated platform-agnostic modular-portion of the data pipeline architecture;
      determining a set of pre-existing data pipeline architectures that use the generated platform-agnostic modular-portion of the data pipeline; and
      in response to determining the set of pre-existing data pipeline architectures that use the generated platform-agnostic modular-portion of the data pipeline, updating at least a subset of the set of pre-existing data pipeline architectures to incorporate the update to the at least one node of the set of nodes indicating the first data pipeline component.

2. The system of claim 1, wherein the instructions when executed by the at least one processor further perform operations comprising:
   retrieving the platform-agnostic modular-portion of the data pipeline architecture from the remote database;
   extracting an identifier corresponding to each node of the set of nodes of the platform-agnostic modular-portion of the data pipeline architecture to determine a respective data pipeline component type;
   providing the determined data pipeline component type corresponding to each node of the set of nodes of the modular-portion of the data pipeline architecture to an artificial intelligence model to generate a set of test cases, wherein the set of test cases comprise test code to test the platform-agnostic modular-portion of the data pipeline architecture; and
   providing the set of test cases to the platform-agnostic modular-portion of the data pipeline architecture during a test routine.

3. The system of claim 2, wherein the instructions when executed by the at least one processor further perform operations comprising:
   receiving a set of test case results in response to providing the set of test cases to the platform-agnostic modular-portion of the data pipeline architecture during the test routine;
   parsing the set of test case results to identify an anomaly included in the test case results;

determining (i) a type of anomaly corresponding to the identified anomaly and (ii) a corresponding data pipeline component of the modular-portion of the data pipeline architecture; and updating the determined corresponding data pipeline component of the platform-agnostic modular-portion of the data pipeline architecture with an updated parameter to resolve the type of anomaly corresponding to the identified anomaly, wherein the updating comprises providing the type of error corresponding to the identifier error and the corresponding data pipeline component of the platform-agnostic modular-portion of the data pipeline architecture to a second artificial intelligence model configured to output recommended update parameters.

4. The system of claim 1, wherein the instructions when executed by the at least one processor further perform operations comprising:

receiving, via the GUI, within the web-browsing application, a user defined prompt indicating an intended data pipeline output result;

providing the user defined prompt indicating the intended data pipeline output result to a large language model (LLM) trained to provide recommended data pipeline architectures based on the intended data pipeline output result, wherein the LLM is communicatively connected to a generative model configured to provide data pipeline component configurations based on historical data-pipeline-architectures; and receiving, via the GUI, the platform-agnostic data pipeline, wherein the platform-agnostic data pipeline is generated using a first data pipeline component configuration received from the generative model.

5. The system of claim 1, wherein the instructions when executed by the at least one processor further perform operations comprising:

receiving, via the GUI within the web-browsing application, a second user selection of a second platform-agnostic modular-portion of a second data pipeline architecture, wherein the second platform-agnostic modular-portion of the second data pipeline architecture is (i) stored in the remote database and (ii) is pre-generated;

linking the second platform-agnostic modular-portion of the second data pipeline architecture to the platform-agnostic data pipeline; and in response to the linking, generating, via the transformation component, an updated version of the platform-agnostic data pipeline using (i) the platform-agnostic data pipeline and (ii) the second platform-agnostic modular-portion of the second data pipeline architecture.

6. The system of claim 1, wherein updating the set of pre-existing data pipeline architectures to incorporate the update to the at least one node of the set of nodes indicating the first data pipeline component further comprises:

determining the subset of the set of pre-existing data pipeline architectures, wherein the subset of the set of pre-existing data pipeline architectures are associated with an indication to accept updates corresponding to the generated platform-agnostic modular-portion of the data pipeline; and updating the subset of the set of pre-existing data pipeline architectures that are associated with the indication to accept updates to incorporate the update to the at least one node of the set of nodes indicating the first data pipeline component, in lieu of other pre-existing data pipeline architectures of the set of pre-existing data pipeline architectures that are associated with an indication to reject updates corresponding to the generated platform-agnostic modular-portion of the data pipeline.

7. A computer-implemented method for facilitating updates to data pipelines using modularly-generated data pipeline portions, the method comprising:

receiving, via a graphical user interface (GUI), a user selection of a portion of a data pipeline comprising (i) a set of nodes each indicating a data pipeline component and (ii) a set of links linking the set of nodes;

generating a modular-portion of a data pipeline architecture, via a transformation component, based on the user selection;

storing the modular-portion of the data pipeline architecture in a remote database;

receiving an update to at least one node of the set of nodes indicating a first data pipeline component of the modular-portion of the data pipeline architecture; and updating at least a subset of a set of pre-existing data pipelines that use the generated modular-portion of the data pipeline to incorporate the update to the at least one node of the set of nodes indicating the first data pipeline component.

8. The method of claim 7, further comprising:

retrieving the modular-portion of the data pipeline architecture from the remote database;

extracting an identifier corresponding to each node of the set of nodes of the modular-portion of the data pipeline architecture to determine a respective data pipeline component type;

providing the determined data pipeline component type corresponding to each node of the set of nodes of the modular-portion of the data pipeline architecture to an artificial intelligence model to generate a set of test cases, wherein the set of test cases comprise test code to test the modular-portion of the data pipeline architecture; and providing the set of test cases to the modular-portion of the data pipeline architecture during a test routine.

9. The method of claim 8, further comprising:

receiving a set of test case results in response to providing the set of test cases to the modular-portion of the data pipeline architecture during the test routine, wherein the set of test cases are provided to the modular-portion of the data pipeline architecture;

parsing the set of test case results to identify an anomaly included in the test case results;

determining (i) a type of anomaly corresponding to the identified anomaly and (ii) a corresponding data pipeline component of the modular-portion of the data pipeline architecture; and updating the determined corresponding data pipeline component of the modular-portion of the data pipeline architecture with an updated parameter to resolve the type of anomaly corresponding to the identified anomaly, wherein the updating comprises providing the type of error corresponding to the identifier error and the corresponding data pipeline component of the modular-portion of the data pipeline architecture to a second artificial intelligence model configured to output recommended update parameters.

10. The method of claim 7, further comprising:

receiving, via the GUI, a user defined prompt indicating an intended data pipeline output result;

providing the user defined prompt indicating the intended data pipeline output result to a large language model (LLM) trained to provide recommended data pipeline architectures based on the intended data pipeline output result, wherein the LLM is communicatively connected to a generative model configured to provide data pipeline component configurations based on historical data-pipeline-architectures; and receiving, via the GUI, the data pipeline, wherein the data pipeline is generated using a first data pipeline component configuration received from the generative model.

11. The method of claim 7, further comprising:
receiving, via the GUI, a second user selection of a second modular-portion of a second data pipeline architecture, wherein the second modular-portion of the second data pipeline architecture is (i) stored in the remote database and (ii) is pre-generated;
linking the second modular-portion of the second data pipeline architecture to the data pipeline; and
in response to the linking, generating, via the transformation component, an updated version of the data pipeline using (i) the data pipeline and (ii) the second modular-portion of the second data pipeline architecture, wherein the second modular-portion of the second data pipeline architecture is linked to the data pipeline.

12. The method of claim 7, wherein updating at least the subset of the set of pre-existing data pipeline architectures to incorporate the update to the at least one node of the set of nodes indicating the first data pipeline component further comprises:
determining the subset of the set of pre-existing data pipeline architectures, wherein the subset of the set of pre-existing data pipeline architectures are associated with an indication to accept updates corresponding to the generated modular-portion of the data pipeline; and
updating the subset of the set of pre-existing data pipeline architectures that are associated with the indication to accept updates to incorporate the update to the at least one node of the set of nodes indicating the first data pipeline component, in lieu of other pre-existing data pipeline architectures of the set of pre-existing data pipeline architectures that are associated with an indication to reject updates corresponding to the generated modular-portion of the data pipeline.

13. The method of claim 7, further comprising:
in response to receiving the update to the at least one node of the set of nodes indicating the first data pipeline component of the modular-portion of the data pipeline architecture, determining that the update to the at least one node is associated with a second update to a link that links the at least one node to another node of the modular-portion of the data pipeline architecture, wherein the update to the at least one node of the set of nodes indicating the first data pipeline component of the modular-portion of the data pipeline architecture is received; and
in response to determining that the update to the at least one node is associated with the second update to the link that links the at least one node to the other node of the modular-portion of the data pipeline architecture, updating the subset of the set of pre-existing data pipelines to incorporate the second update to the link that links the at least one node to the other node of the modular-portion of the data pipeline architecture, wherein it is determined that the update to the at least one node is associated with the second update to the link that links the at least one node to the other node of the modular-portion of the data pipeline architecture.

14. The method of claim 7, further comprising:
in response to receiving the update to the at least one node of the set of nodes indicating the first data pipeline component of the modular-portion of the data pipeline architecture, transmitting a message to each of the set of pre-existing data pipelines that use the generated modular-portion of the data pipeline indicating the update to the at least one node of the set of nodes indicating the first data pipeline component, wherein the update to the at least one node of the set of nodes indicating the first data pipeline component of the modular-portion of the data pipeline architecture is received.

15. One or more non-transitory computer-readable media comprising instructions that, when executed by one or more processors, cause operations comprising:
receiving, via a graphical user interface (GUI), a user selection of a portion of a data pipeline comprising (i) a set of nodes each indicating a data pipeline component and (ii) a set of links linking the set of nodes;
generating a modular-portion of a data pipeline architecture, via a transformation component, based on the user selection;
storing the modular-portion of the data pipeline architecture in a remote database;
receiving an update to at least one node of the set of nodes indicating a first data pipeline component of the modular-portion of the data pipeline architecture; and
updating at least a subset of a set of pre-existing data pipelines that use the generated modular-portion of the data pipeline to incorporate the update to the at least one node of the set of nodes indicating the first data pipeline component.

16. The media of claim 15, wherein the instructions that, when executed by the one or more processors, further cause operations comprising:
retrieving the modular-portion of the data pipeline architecture from the remote database;
extracting an identifier corresponding to each node of the set of nodes of the modular-portion of the data pipeline architecture to determine a respective data pipeline component type;
providing the determined data pipeline component type corresponding to each node of the set of nodes of the modular-portion of the data pipeline architecture to an artificial intelligence model to generate a set of test cases, wherein the set of test cases comprise test code to test the modular-portion of the data pipeline architecture; and
providing the set of test cases to the modular-portion of the data pipeline architecture during a test routine.

17. The media of claim 16, wherein the instructions that, when executed by the one or more processors, further cause operations comprising:
receiving a set of test case results in response to providing the set of test cases to the modular-portion of the data pipeline architecture during the test routine;
parsing the set of test case results to identify an anomaly included in the test case results;
determining (i) a type of anomaly corresponding to the identified anomaly and (ii) a corresponding data pipeline component of the modular-portion of the data pipeline architecture; and
updating the determined corresponding data pipeline component of the modular-portion of the data pipeline architecture with an updated parameter to resolve the type of anomaly corresponding to the identified anomaly, wherein the updating comprises providing the type of error corresponding to the identified error and the corresponding data pipeline component of the modular-portion of the data pipeline architecture to a second artificial intelligence model configured to output recommended update parameters.

18. The media of claim 15, wherein the instructions that, when executed by the one or more processors, further cause operations comprising:
receiving, via the GUI, a user defined prompt indicating an intended data pipeline output result;
providing the user defined prompt indicating the intended data pipeline output result to a large language model (LLM) trained to provide recommended data pipeline architectures based on the intended data pipeline output result, wherein the LLM is communicatively connected to a generative model configured to provide data pipeline component configurations based on historical data-pipeline-architectures; and
receiving, via the GUI, the data pipeline, wherein the data pipeline is generated using a first data pipeline component configuration received from the generative model.

19. The media of claim 15, wherein the instructions that, when executed by the one or more processors, further cause operations comprising:
receiving, via the GUI, a second user selection of a second modular-portion of a second data pipeline architecture, wherein the second modular-portion of the second data pipeline architecture is (i) stored in the remote database and (ii) is pre-generated;
linking the second modular-portion of the second data pipeline architecture to the data pipeline; and
in response to the linking, generating, via the transformation component, an updated version of the data pipeline using (i) the data pipeline and (ii) the second modular-portion of the second data pipeline architecture.

20. The media of claim 15, wherein updating at least the subset of the set of pre-existing data pipeline architectures to incorporate the update to the at least one node of the set of nodes indicating the first data pipeline component further comprises:
determining the subset of the set of pre-existing data pipeline architectures, wherein the subset of the set of pre-existing data pipeline architectures are associated with an indication to accept updates corresponding to the generated modular-portion of the data pipeline; and
updating the subset of the set of pre-existing data pipeline architectures that are associated with the indication to accept updates to incorporate the update to the at least one node of the set of nodes indicating the first data pipeline component, in lieu of other pre-existing data pipeline architectures of the set of pre-existing data pipeline architectures that are associated with an indication to reject updates corresponding to the generated modular-portion of the data pipeline.

* * * * *

UNITED STATES PATENT AND TRADEMARK OFFICE
CERTIFICATE OF CORRECTION

| | | |
|---|---|---|
| PATENT NO. | : 12,118,338 B1 | Page 1 of 1 |
| APPLICATION NO. | : 18/641166 | |
| DATED | : October 15, 2024 | |
| INVENTOR(S) | : David Benamu et al. | |

It is certified that error appears in the above-identified patent and that said Letters Patent is hereby corrected as shown below:

On the Title Page

Item (54), in Column 1, in "Title", Lines 3-4, delete "PLATFORM- AGNOSTIC" and insert
-- PLATFORM-AGNOSTIC --.

In the Specification

In Column 1, Lines 3-4, delete "PLATFORM- AGNOSTIC" and insert
-- PLATFORM-AGNOSTIC --.

In Column 11, Line 12, delete "5." and insert -- 5 --.

In Column 23, Line 50, delete "by" and insert -- By --.

In Column 24, Line 35, delete "in in" and insert -- in --.

Signed and Sealed this
Fourth Day of March, 2025

Coke Morgan Stewart
*Acting Director of the United States Patent and Trademark Office*